(12) United States Patent
Macaluso

(10) Patent No.: US 11,738,641 B1
(45) Date of Patent: *Aug. 29, 2023

(54) FLEXIBLE ARM GENERATOR

(71) Applicant: Anthony Macaluso, San Diego, CA (US)

(72) Inventor: Anthony Macaluso, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,303

(22) Filed: Mar. 24, 2023

Related U.S. Application Data

(63) Continuation of application No. 18/066,836, filed on Dec. 15, 2022, now Pat. No. 11,628,724, which is a continuation of application No. 17/690,998, filed on Mar. 9, 2022, now Pat. No. 11,577,606.

(51) Int. Cl.
*B60K 25/08* (2006.01)
*F03G 7/08* (2006.01)

(52) U.S. Cl.
CPC ............... *B60K 25/08* (2013.01); *F03G 7/08* (2013.01)

(58) Field of Classification Search
CPC .................................. B60K 25/08; F03G 7/08
See application file for complete search history.

(56) References Cited

U.S. PATENT DOCUMENTS

| | | |
|---|---|---|
| 2,451,965 A | 10/1948 | Longenecker |
| 2,660,443 A | 11/1953 | Miller |
| 3,859,589 A | 1/1975 | Rush |
| 3,891,044 A | 6/1975 | Tiede |
| 3,943,370 A | 3/1976 | Watanabe |
| 3,961,678 A | 6/1976 | Hirano et al. |
| 3,978,936 A | 9/1976 | Schwartz |
| 4,214,160 A | 7/1980 | Fies et al. |
| 4,314,160 A | 2/1982 | Boodman et al. |
| 4,364,448 A | 12/1982 | Ikuma |
| 4,404,513 A | 9/1983 | Campen |
| 4,476,947 A | 10/1984 | Rynbrandt |
| 4,539,496 A | 9/1985 | Thomas et al. |

(Continued)

FOREIGN PATENT DOCUMENTS

| | | |
|---|---|---|
| CH | 202100372 | 4/2022 |
| CN | 108473063 | 8/2013 |

(Continued)

*Primary Examiner* — Viet P Nguyen
(74) *Attorney, Agent, or Firm* — Knobbe Martens Olson & Bear LLP

(57) ABSTRACT

The disclosure is directed to an apparatus or a system for generating energy in response to a vehicle wheel rotation. The apparatus or the system may include a roller configured to be positioned in substantial physical contact within a groove of a wheel of the vehicle. The roller may be configured to rotate in response to a rotation of the wheel. The apparatus or the system may further include a flexible arm rotatably couplable to the roller such that rotation of the roller causes the flexible arm to rotate. The flexible arm may be configured to exert a downward force on the roller to increase the friction between the roller and the groove of the wheel. The apparatus or the system may further include a first generator operably coupled to the flexible arm and configured to generate an electrical output based on the rotation of the flexible arm shaft and convey the electrical output to an energy storage device or vehicle motor.

20 Claims, 26 Drawing Sheets

(56) References Cited

U.S. PATENT DOCUMENTS

| | | |
|---|---|---|
| 4,579,188 A | 4/1986 | Facer |
| 5,045,646 A | 9/1991 | Musachio |
| 5,078,227 A | 1/1992 | Becker |
| 5,086,857 A | 2/1992 | Dale |
| 5,105,776 A | 4/1992 | Tsuchiya |
| 5,316,101 A | 5/1994 | Gannon |
| 5,412,293 A | 5/1995 | Minezawa et al. |
| 5,491,390 A | 2/1996 | McGreen |
| 5,671,821 A | 9/1997 | McGreen |
| 5,680,907 A | 10/1997 | Weihe |
| 5,710,504 A | 1/1998 | Pascual et al. |
| 5,735,363 A | 4/1998 | Horovitz et al. |
| 5,767,663 A | 6/1998 | Lu |
| 5,921,334 A | 7/1999 | Al-Dokhi |
| 5,992,553 A | 11/1999 | Morrison |
| 6,064,178 A | 5/2000 | Miller |
| 6,065,557 A | 5/2000 | von Keyserling |
| 6,220,381 B1 | 4/2001 | Damron et al. |
| 6,390,215 B1 | 5/2002 | Kodama |
| 6,502,842 B2 | 1/2003 | Ko |
| 6,531,838 B2 | 3/2003 | Parks |
| 6,703,716 B2 | 3/2004 | Chiu |
| 6,717,280 B1 | 4/2004 | Bienville |
| 6,987,327 B1 | 1/2006 | Lucatero |
| 7,183,746 B1 | 2/2007 | Carter |
| 7,279,799 B1 | 10/2007 | McCauley |
| 7,514,803 B2 | 4/2009 | Wilks |
| 7,547,980 B2 | 6/2009 | Harrison |
| 7,753,010 B2 | 7/2010 | Rutledge |
| 7,913,783 B2 | 3/2011 | Elmaleh |
| 8,063,609 B2 | 11/2011 | Salasoo et al. |
| 8,089,168 B2 * | 1/2012 | Chevrette .......... F03G 7/08 290/1 R |
| 8,206,263 B2 | 6/2012 | Tsuchikawa |
| 8,347,999 B2 | 1/2013 | Koelsch et al. |
| 8,573,346 B2 | 11/2013 | Duignan |
| 8,643,201 B2 | 2/2014 | Scott |
| 8,712,620 B2 | 4/2014 | Jackson |
| 8,723,344 B1 | 5/2014 | Dierickx |
| 8,872,368 B1 | 10/2014 | Kim et al. |
| 8,907,631 B1 | 12/2014 | Gurries |
| 9,236,761 B2 | 1/2016 | Strothmann |
| 9,242,698 B2 | 1/2016 | Frieden |
| 9,321,357 B2 | 4/2016 | Caldeira et al. |
| 9,376,971 B2 | 6/2016 | Luther et al. |
| 9,415,660 B2 | 8/2016 | Koelsch |
| 9,457,666 B2 | 10/2016 | Caldeira et al. |
| 9,981,553 B2 | 5/2018 | Schafer et al. |
| 10,077,056 B1 | 9/2018 | Fields et al. |
| 10,077,752 B1 | 9/2018 | Lee et al. |
| 10,157,050 B2 | 12/2018 | Kotani et al. |
| 10,293,702 B2 | 5/2019 | Tu et al. |
| 10,513,180 B2 | 12/2019 | Quill |
| 10,664,917 B1 | 5/2020 | Wasserman |
| 10,787,089 B1 | 9/2020 | Macaluso |
| 10,797,564 B1 | 10/2020 | Griggs |
| 10,889,186 B2 | 1/2021 | Schutt |
| 10,903,679 B2 | 1/2021 | Schmalzrieth et al. |
| 11,007,878 B2 | 5/2021 | Kamino et al. |
| 11,072,254 B1 | 7/2021 | Macaluso |
| 11,117,481 B2 | 9/2021 | Macaluso |
| 11,130,415 B2 | 9/2021 | Macaluso |
| 11,133,729 B2 | 9/2021 | Macaluso |
| 11,222,750 B1 | 1/2022 | Macaluso |
| 11,289,974 B2 | 3/2022 | Macaluso |
| 11,299,054 B2 | 4/2022 | Macaluso |
| 11,318,856 B2 | 5/2022 | Macaluso |
| 11,322,311 B2 | 5/2022 | Macaluso |
| 11,431,225 B2 | 8/2022 | Macaluso |
| 11,432,123 B2 | 8/2022 | Macaluso |
| 11,458,853 B2 | 10/2022 | Macaluso |
| 11,472,306 B1 | 10/2022 | Macaluso |
| 11,548,399 B1 | 1/2023 | Macaluso |
| 11,551,486 B1 | 1/2023 | Everett et al. |
| 11,577,606 B1 | 2/2023 | Macaluso |
| 11,587,740 B2 | 2/2023 | Macaluso |
| 11,618,332 B1 | 4/2023 | Macaluso |
| 11,626,775 B2 | 4/2023 | Macaluso |
| 11,627,449 B2 | 4/2023 | Macaluso |
| 11,628,724 B1 | 4/2023 | Macaluso |
| 11,641,572 B2 | 5/2023 | Macaluso |
| 2003/0071464 A1 | 4/2003 | Chiu |
| 2003/0139859 A1 | 7/2003 | Hanada |
| 2003/0184258 A1 | 10/2003 | VonderHaar |
| 2004/0012205 A1 | 1/2004 | Sua-An |
| 2005/0224263 A1 | 10/2005 | Vasilantone |
| 2006/0238258 A1 | 10/2006 | D'Amore |
| 2007/0075677 A1 | 4/2007 | Alvarez-Troncoso |
| 2007/0090702 A1 | 4/2007 | Schiller |
| 2007/0187957 A1 | 8/2007 | Harrison |
| 2008/0066979 A1 | 3/2008 | Carter |
| 2008/0223637 A1 | 9/2008 | Bartilson |
| 2008/0289890 A1 | 11/2008 | Stoltzfus |
| 2008/0297109 A1 | 12/2008 | Sandberg et al. |
| 2009/0033254 A1 | 2/2009 | Nagashima et al. |
| 2009/0079417 A1 | 3/2009 | Mort et al. |
| 2009/0145674 A1 | 6/2009 | Lee |
| 2009/0194998 A1 | 8/2009 | Lin |
| 2009/0230766 A1 | 9/2009 | Miyama |
| 2009/0250276 A1 | 10/2009 | Goodwin et al. |
| 2009/0256450 A1 | 10/2009 | Chevrette |
| 2010/0019718 A1 | 1/2010 | Salasoo et al. |
| 2010/0116574 A1 | 5/2010 | Gilmore |
| 2010/0117600 A1 | 5/2010 | Fazakas |
| 2010/0327600 A1 | 12/2010 | Koelsch |
| 2011/0025068 A1 | 2/2011 | Campbell |
| 2011/0089760 A1 | 4/2011 | Castelaz et al. |
| 2011/0100735 A1 | 5/2011 | Flett |
| 2011/0106329 A1 | 5/2011 | Donnelly et al. |
| 2011/0163717 A1 | 7/2011 | Gale |
| 2011/0189507 A1 | 8/2011 | Reis |
| 2011/0200193 A1 | 8/2011 | Blitz et al. |
| 2011/0302078 A1 | 12/2011 | Failing |
| 2011/0320074 A1 | 12/2011 | Erlston et al. |
| 2012/0012406 A1 | 1/2012 | Stoicoviciu |
| 2012/0054095 A1 | 3/2012 | Lesandro et al. |
| 2012/0068537 A1 | 3/2012 | Hintz et al. |
| 2012/0237799 A1 | 9/2012 | Jiang |
| 2012/0309455 A1 | 12/2012 | Klose et al. |
| 2013/0067253 A1 | 3/2013 | Tsuda |
| 2013/0081886 A1 | 4/2013 | Jaberian |
| 2013/0096759 A1 | 4/2013 | Breton et al. |
| 2013/0119665 A1 | 5/2013 | Berbari |
| 2013/0257144 A1 | 10/2013 | Caldeira et al. |
| 2013/0257145 A1 | 10/2013 | Caldeira et al. |
| 2013/0266826 A1 | 10/2013 | Cowperthwaite |
| 2013/0332014 A1 | 12/2013 | Jackson |
| 2014/0091573 A1 | 4/2014 | Berbari |
| 2014/0132155 A1 | 5/2014 | Strothmann |
| 2014/0197780 A1 | 7/2014 | Imamura |
| 2014/0210398 A1 | 7/2014 | Powell |
| 2014/0244082 A1 | 8/2014 | Caron |
| 2014/0266004 A1 | 9/2014 | Andrews, Jr. |
| 2014/0266070 A1 | 9/2014 | Kurtzman |
| 2014/0283092 A1 | 9/2014 | Mowatt et al. |
| 2014/0285209 A1 | 9/2014 | Stichowski et al. |
| 2014/0368041 A1 | 12/2014 | Tu et al. |
| 2015/0008867 A1 | 1/2015 | Smychkovich |
| 2015/0089981 A1 | 4/2015 | Renfro |
| 2015/0222553 A1 | 8/2015 | Macdonald et al. |
| 2015/0249362 A1 | 9/2015 | Bridgelall et al. |
| 2015/0260835 A1 | 9/2015 | Widmer et al. |
| 2015/0262154 A1 | 9/2015 | Wolfson |
| 2015/0343909 A1 | 12/2015 | Hikiri |
| 2015/0347121 A1 | 12/2015 | Harumoto |
| 2015/0363855 A1 | 12/2015 | Wu et al. |
| 2016/0034952 A1 | 2/2016 | Parkin et al. |
| 2016/0071338 A1 | 3/2016 | McQuade et al. |
| 2016/0089981 A1 | 3/2016 | Kodawara |
| 2016/0111907 A1 | 4/2016 | Lynds |
| 2016/0164373 A1 | 6/2016 | Liao et al. |
| 2016/0189311 A1 | 6/2016 | Erickson et al. |
| 2016/0236578 A1 | 8/2016 | Liao |
| 2016/0243960 A1 | 8/2016 | Wood |

(56) References Cited

U.S. PATENT DOCUMENTS

| | | |
|---|---|---|
| 2016/0348788 A1 | 12/2016 | Lemmers |
| 2017/0063124 A1 | 3/2017 | Yu et al. |
| 2017/0077534 A1 | 3/2017 | Guidry et al. |
| 2017/0117720 A1 | 4/2017 | Yung |
| 2017/0131999 A1 | 5/2017 | Dolby et al. |
| 2017/0142766 A1 | 5/2017 | Kim |
| 2017/0176540 A1 | 6/2017 | Omi |
| 2017/0191459 A1 | 7/2017 | Zhang |
| 2017/0363433 A1 | 12/2017 | Tennent et al. |
| 2017/0366017 A1 | 12/2017 | Clay et al. |
| 2018/0009329 A1 | 1/2018 | Tellez |
| 2018/0083469 A1 | 3/2018 | Bauer et al. |
| 2018/0154779 A1 | 6/2018 | Choi |
| 2018/0156144 A1 | 6/2018 | Inoue |
| 2018/0166750 A1 | 6/2018 | Chang |
| 2018/0204173 A1 | 7/2018 | Painter et al. |
| 2018/0204253 A1 | 7/2018 | Painter et al. |
| 2018/0204281 A1 | 7/2018 | Painter et al. |
| 2018/0215272 A1 | 8/2018 | Vitullo et al. |
| 2018/0254732 A1 | 9/2018 | Smolenaers |
| 2018/0312159 A1 | 11/2018 | Jent, II |
| 2018/0328745 A1 | 11/2018 | Nagy et al. |
| 2018/0370537 A1 | 12/2018 | Wu |
| 2019/0001804 A1 | 1/2019 | Wilhide |
| 2019/0004580 A1 | 1/2019 | Wilhide |
| 2019/0077254 A1 | 3/2019 | Stanley |
| 2019/0140245 A1 | 5/2019 | Mensch |
| 2019/0184843 A1 | 6/2019 | Jung et al. |
| 2019/0199104 A1 | 6/2019 | Shim |
| 2019/0245375 A1 | 8/2019 | Schmalzrieth et al. |
| 2019/0292973 A1 | 9/2019 | Jiang et al. |
| 2019/0329650 A1 | 10/2019 | Quill |
| 2019/0351895 A1 | 11/2019 | Ben-Ari |
| 2019/0351899 A1 | 11/2019 | Adam |
| 2019/0351948 A1 | 11/2019 | Derissaint |
| 2019/0359080 A1 | 11/2019 | Hellgren |
| 2019/0362922 A1 | 11/2019 | Bae et al. |
| 2019/0383627 A1 | 12/2019 | Nangeroni et al. |
| 2020/0184591 A1 | 1/2020 | Balu et al. |
| 2020/0039379 A1 | 2/2020 | Schlosser |
| 2020/0094695 A1 | 3/2020 | Bowman |
| 2020/0207209 A1 | 7/2020 | Engel |
| 2020/0238929 A1 | 7/2020 | Wippler |
| 2020/0258325 A1 | 8/2020 | Maria |
| 2020/0295412 A1 | 9/2020 | Chen |
| 2020/0324763 A1 | 10/2020 | Switkes et al. |
| 2020/0353839 A1 | 11/2020 | Tarchinski et al. |
| 2020/0381784 A1 | 12/2020 | Yamamoto |
| 2020/0384873 A1 | 12/2020 | Macaluso |
| 2020/0384879 A1 | 12/2020 | Ebisu et al. |
| 2021/0001737 A1 | 1/2021 | Hoess et al. |
| 2021/0046833 A1 | 2/2021 | Macaluso |
| 2021/0065073 A1 | 3/2021 | Maeda et al. |
| 2021/0080943 A1 | 3/2021 | Iwamoto et al. |
| 2021/0110323 A1 | 4/2021 | Munoz et al. |
| 2021/0167988 A1 | 6/2021 | Harata et al. |
| 2021/0173411 A1 | 6/2021 | Rao et al. |
| 2021/0183175 A1 | 6/2021 | Dunger |
| 2021/0188101 A1 | 6/2021 | Abu Qahouq et al. |
| 2021/0197687 A1 | 7/2021 | Searcy |
| 2021/0229687 A1 | 7/2021 | Hashimoto et al. |
| 2021/0284043 A1 | 9/2021 | Wang et al. |
| 2021/0312544 A1 | 10/2021 | Inoue et al. |
| 2021/0313121 A1 | 10/2021 | Macaluso |
| 2021/0334913 A1 | 10/2021 | Klein |
| 2021/0405996 A1 | 12/2021 | Takatsuna et al. |
| 2022/0016941 A1 | 1/2022 | Sams |
| 2022/0028625 A1 | 1/2022 | Macaluso |
| 2022/0028627 A1 | 1/2022 | Macaluso |
| 2022/0050143 A1 | 2/2022 | Maeda et al. |
| 2022/0052582 A1 | 2/2022 | Giannotta |
| 2022/0111758 A1 | 4/2022 | Ijaz et al. |
| 2022/0179641 A1 | 6/2022 | Harata et al. |
| 2022/0179644 A1 | 6/2022 | Harata et al. |
| 2022/0253301 A1 | 8/2022 | Harata et al. |
| 2022/0261836 A1 | 8/2022 | Kimomura et al. |
| 2022/0301775 A1 | 9/2022 | Macaluso |
| 2022/0314837 A1 | 10/2022 | Gupta |
| 2022/0334818 A1 | 10/2022 | McFarland |
| 2022/0334822 A1 | 10/2022 | Sakakibara et al. |
| 2022/0340035 A1 | 10/2022 | Kim et al. |
| 2022/0374027 A1 | 11/2022 | Watts et al. |
| 2023/0005305 A1 | 1/2023 | Sakurai et al. |
| 2023/0068432 A1 | 3/2023 | Upadhyay et al. |
| 2023/0100927 A1 | 3/2023 | Macaluso |
| 2023/0109674 A1 | 4/2023 | Macaluso |
| 2023/0125192 A1 | 4/2023 | Macaluso |
| 2023/0143096 A1 | 5/2023 | Macaluso |
| 2023/0150380 A1 | 5/2023 | Macaluso |
| 2023/0154692 A1 | 5/2023 | Macaluso |
| 2023/0171574 A1 | 6/2023 | Macaluso |
| 2023/0187145 A1 | 6/2023 | Macaluso |

FOREIGN PATENT DOCUMENTS

| | | |
|---|---|---|
| CN | 106846153 | 6/2017 |
| CN | 110549902 | 12/2019 |
| CN | 110633815 | 12/2019 |
| CN | 107804326 | 1/2020 |
| CN | 110889601 | 3/2020 |
| CN | 113479111 | 10/2021 |
| DE | 102017008723 | 5/2018 |
| EP | 1 253 698 | 10/2002 |
| JP | 2002-257026 | 9/2002 |
| JP | 2003-278633 | 10/2003 |
| JP | 2011-132873 | 7/2011 |
| JP | 2015-027164 | 2/2015 |
| JP | 2016-170600 | 9/2016 |
| JP | 6687274 | 4/2020 |
| KR | 102266609 | 6/2021 |
| WO | WO 09/149769 | 12/2009 |
| WO | WO 10/133863 | 11/2010 |
| WO | WO 11/148531 | 12/2011 |
| WO | WO 17/030354 | 2/2017 |
| WO | WO 17/213079 | 12/2017 |
| WO | WO 18/046979 | 3/2018 |
| WO | WO 18/083279 | 5/2018 |
| WO | WO 19/117894 | 6/2019 |
| WO | WO 19/219997 | 11/2019 |
| WO | WO 19/240783 | 12/2019 |
| WO | WO 20/191367 | 9/2020 |
| WO | WO 21/187071 | 9/2021 |
| WO | WO 22/015017 | 1/2022 |
| WO | WO 22/219510 | 10/2022 |

\* cited by examiner

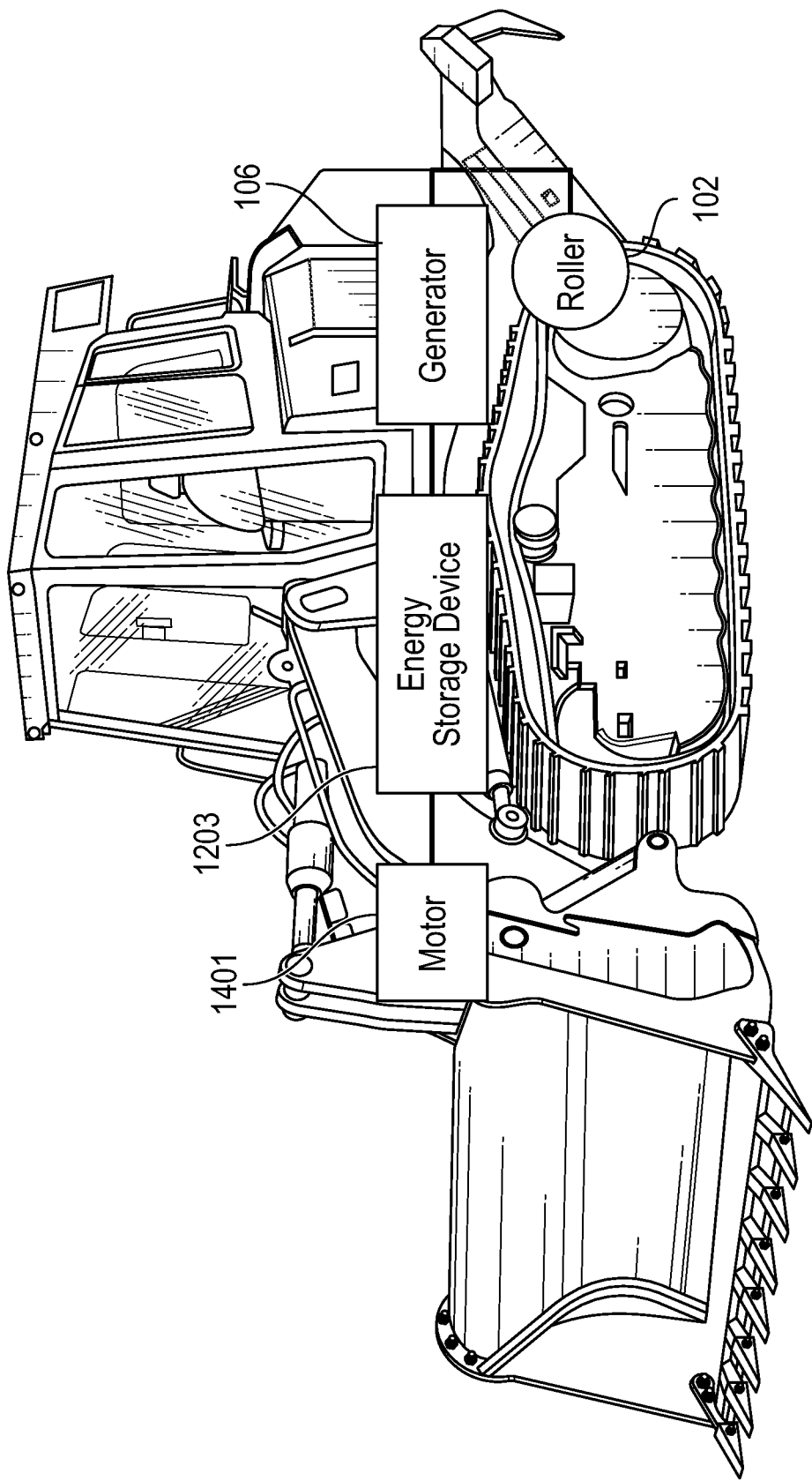

US 11,738,641 B1

FLEXIBLE ARM GENERATOR

CROSS REFERENCE TO RELATED APPLICATIONS

This application is a continuation of U.S. patent application Ser. No. 18/066,836, filed Dec. 15, 2022, which is a continuation of U.S. patent application Ser. No. 17/690,998, filed Mar. 9, 2022, which issued as U.S. Pat. No. 11,577,606. The disclosure of each of the aforementioned applications is incorporated herein in its entirety for all purposes. Any and all applications for which a foreign or domestic priority claim is identified in the Application Data Sheet as filed with the present application are hereby incorporated by reference under 37 CFR 1.57.

BACKGROUND

Field of Disclosure

The present disclosure relates generally to generating and providing energy for a vehicle powered, at least in part, by electricity, and more specifically, to generating and conveying the energy to the vehicle while the vehicle is mobile.

Background

Electric vehicles derive locomotion power from electricity often received from an energy storage device within the electric vehicle. Battery electric vehicles (BEVs) are often proposed to have an energy storage/containment device, such as a battery, that is charged through some type of wired or wireless connection at one or more stationary locations, for example household or commercial supply sources. The wired charging connections require cables or other similar connectors physically connected to a stationary power supply. The wireless charging connections require antenna(s) or other similar structures wirelessly connected to a power supply that generates a wireless field via its own antenna(s). However, such wired and wireless stationary charging systems may be inconvenient or cumbersome and have other drawbacks, such as degradation during energy transference, inefficiencies or losses, requiring a specific location for charging, and so forth. As such, alternatives for stationary wired or wireless charging systems and methods that efficiently and safely transfer energy for charging electric vehicles are desirable.

SUMMARY

Various embodiments of systems, methods and devices within the scope of the appended claims each have several aspects, no single one of which is solely responsible for the desirable attributes described herein. Without limiting the scope of the appended claims, the description below describes some prominent features.

Details of one or more embodiments of the subject matter described in this specification are set forth in the accompanying drawings and the description below. Other features, aspects, and advantages will become apparent from the description, the drawings, and the claims. Note that relative dimensions of the following figures may not be drawn to scale.

In a first aspect, a system for generating energy in response to a vehicle wheel rotation is provided. The system may include, for example, a roller housing located within a wheel well, a roller that is rotatably attached to the roller housing, the roller contacting a groove of a wheel, a generator connected to the roller housing, and a flexible arm connected to the roller housing which exerts a downward force on the roller.

In some embodiments, the groove the groove circumferentially navigates the wheel. In some embodiments, the flexible arm is connected to the roller. In some embodiments, the roller housing contains the generator. In some embodiments, the flexible arm connects the generator to the roller housing. In some embodiments, the system further includes a second roller contacting the groove of the wheel. In some embodiments, the system further includes a second roller contacting a second groove of the wheel. In some embodiments, the second groove circumferentially navigates the wheel and is parallel to the grove of the wheel. In some embodiments, the flexible arm connects the roller housing to the generator. In some embodiments, the wheel is formed of a first material and the groove is formed of a second material. In some embodiments, the flexible arm undergoes a movement when the wheel is displaced vertically such that the downward force is maintained on the wheel. In some embodiments, the movement requires the flexible arm to bend. In some embodiments, the movement requires the flexible arm to pivot about one or more joints.

In a second aspect, a method for generating energy in response to a vehicle wheel rotation is disclosed. The method includes, for example, rotating a wheel, rotating a roller in response to the rotation of the wheel, the roller contacting a groove of the wheel, generating, via a generator, an electrical output based on the rotation of the roller, and conveying the electrical output to an energy storage device or a motor.

In some embodiments, the method further includes applying a downward force to the roller via a flexible arm connected to a feature of the vehicle. In some embodiments, the feature is the generator. In some embodiments, the electrical output is conveyed through an electric cable within the flexible arm. In some embodiments, the method further includes rotating the flexible arm in response to the rotation of the roller. In some embodiments, the method further includes converting the electrical output into mechanical output within the motor.

In a third aspect, a device for generating energy in response to a vehicle wheel rotation is provided. The device may include, for example, a roller contacting a vehicle wheel groove, a flexible arm coupled to the roller, whereby the flexible arm exerts a downward force on the roller, and a generator coupled to the roller.

In some embodiments, the generator is mechanically coupled to the roller via the flexible arm. In some embodiments, the flexible arm connects the roller to an energy storage device. In some embodiments, a second flexible arm mechanically couples the generator to an energy storage device. In some embodiments, a second flexible arm electrically couples the generator to an energy storage device. In some embodiments, a roller bump located on the roller contacts the groove of the wheel. In some embodiments, the roller contacts the surface of the wheel.

BRIEF DESCRIPTION OF THE DRAWINGS

FIGS. 12A-12J illustrate example vehicles incorporating the system, a generator, an energy storage device and a motor.

DETAILED DESCRIPTION

Overview

Example embodiments and implementations of an apparatus or a system for generating energy (e.g., in response to the rotation of a wheel of a vehicle) are described herein. The apparatus or system can be implemented in conjunction with a vehicle, such as an electric vehicle. The vehicle can include a car, a truck, a semi-truck, a tractor-trailer, a tractor, farm equipment, construction equipment, carts, scooters, motorcycles, bicycles, trains, trams, and the like, for example. The apparatus or system can comprise one or more rollers configured to be rotatably couplable (e.g., removably coupled either through direct physical contact or through indirect operable coupling) to one or more wheels of a vehicle such that rotation of a wheel of the vehicle causes rotation of the one or more rollers. The point of contact between the wheel and the one or more rollers can be a groove located on the wheel. The one or more rollers can be rotatably coupled (either through direct physical contact or through indirect operable coupling) to one or more generators. The generators can be configured to generate energy (e.g., an electrical output), in response to rotation of the one or more rollers. In some embodiments, the one or more rollers can be rotatably coupled to the one or more generators via one or more flexible arms configured to rotate in response to a rotation of the one or more rollers. In some embodiments, the one or more rollers can be rotatably coupled to the one or more generators via one or more other mechanical coupling devices such as a chain, belt, gearing, pulley, sprocket and the like. In some embodiments, the flexible arm houses these one or more other mechanical coupling devices. In some embodiments, the flexible arm applies a downward force on the roller. In some embodiments, the one or more generators can provide generated energy (e.g., electrical output) to the vehicle. The electrical output that is provided to the vehicle from the generator may be used to power the vehicle. For example, the electrical output may be conveyed to a motor of the vehicle and/or to an energy storage device of the vehicle for later use and/or consumption by the vehicle.

Example Apparatus and System Embodiments and Implementations

Various example embodiments of an apparatus or a system for generating energy are described herein, for example, with reference to the figures. The various embodiments and their implementations are given as examples and are not meant to be limiting of the present disclosure.

Furthermore, the structural and/or operational features described with reference to any of the example embodiments and/or figures are not meant to be limited to that embodiment and/or figure. Rather the structural and/or operation features of the various embodiments and figures may be implemented or otherwise combined in each of the various other embodiments.

Figure 1A:
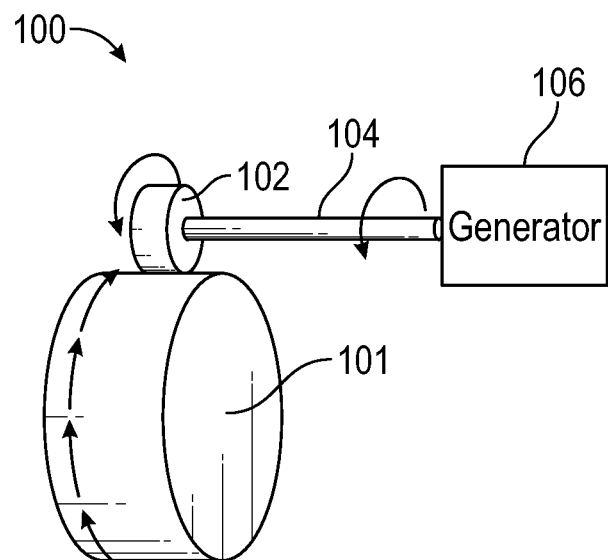
FIG. 1A is a schematic diagram illustrating an example embodiment of a system for generating energy in response to rotation of a wheel of vehicle.

Figure 1A is a diagram illustrating an example embodiment of an apparatus or system 100 comprising a flexible arm generator. As shown in FIG. 1A, the apparatus 100 may comprise a roller 102, a flexible arm 104 and a generator 106. The roller 102 may comprise a substantially cylindrical shape comprising a length, a diameter, a curved surface and a center axis as described in greater detail with reference to FIG. 2. A curved surface of the roller 102 may be in substantial physical contact with a curved surface of the wheel 101. The center axis of the roller 102 may be substantially parallel to a center axis of the wheel 101. The roller 102 may be configured to rotate about its center axis. The roller 102 may be rotatably couplable to a wheel 101 of the vehicle such that rotation of the wheel 101 causes rotation of the roller 102. The roller 102 may rotate in an opposite direction than the wheel 101, for example as shown in FIG. 1A. The roller 102 may rotate at a greater rotational velocity than the wheel 101.

With continued reference to FIG. 1A, the roller 102 may be rotatably coupled to a flexible arm 104 such that rotation of the roller 102 can cause rotation of the flexible arm 104. The flexible arm 104 may rotate about an axis that is substantially parallel to the axis of the roller 102 and in some embodiments the flexible arm may rotate in a same direction as the roller 102, for example as shown in FIG. 1A. In some embodiments, the flexible arm 104 may be fixedly rotatably coupled to the roller 102 such that the flexible arm 104 can only rotate when the roller 102 rotates. In some embodiments, the flexible arm 104 may be configured to rotate when the roller 102 is not rotating. For example, after the roller 102 discontinues rotating, the flexible arm 104 may continue to rotate, for example due to rotational inertia. For example, the roller 102 and/or flexible arm 104 may comprise a one-way ratchet device that causes the flexible arm 104 to rotate when the roller 102 rotates and allows the flexible arm 104 to continue to rotate for a period of time even after the roller 102 stops rotating. In some embodiments, the flexible arm 104 may be configured to not rotate when the roller 102 is rotating. For example, in a disengaged state, as discussed in greater detail herein, the roller 102 may rotate in response to rotation of a vehicle wheel but may not cause rotation of the flexible arm 104 to generate energy at the generator 106.

The flexible arm 104 may be operably coupled to a generator 106. The generator 106 may be configured to generate energy (e.g., an electrical output) in response to mechanical movement such as the rotation of the flexible arm 104. The generator 106 may be electrically coupled to a vehicle 110 (such as the portion of the vehicle illustrated in FIG. 1D) and may provide generated energy to the vehicle, for example to a motor of the vehicle 110 and/or to an energy storage device of the vehicle that includes one or more batteries and/or capacitors (e.g., ultracapacitors) or one or more hypercapacitors (such as discussed below with regard to FIG. 9).

Figure 1B:
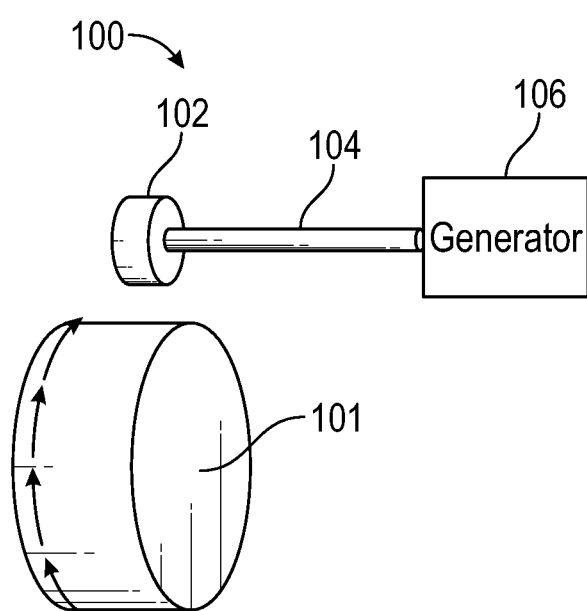
FIG. 1B is a schematic diagram illustrating an example embodiment of the system of FIG. 1A in a disengaged state.

FIG. 1B is a diagram illustrating an example embodiment of the apparatus 100 comprising a flexible arm generator. The apparatus 100 may exist in one of (1) an engaged state or (2) a disengaged state. In the engaged state, the roller 102 may be in physical contact with the wheel 101 (e.g., rotatably coupled to the wheel 101) in which the rotation of the wheel 101 causes the roller 102 to rotate. In some embodiments, in the disengaged state, the roller 102 may not be in physical contact with the wheel 101 such that rotation of the wheel 101 does not cause the roller 102 to rotate. In some embodiments, in the disengaged state, the roller 102 may be in physical contact with the wheel 101 such that rotation of the wheel 101 causes the roller 102 to rotate but the roller 102 may not be rotatably coupled to the flexible arm 104 such that rotation of the roller 102 does not cause the flexible arm 104 (or other similar component) to rotate to cause generation of energy at the generator 106.

FIG. 1B shows the roller 102 in an example disengaged state such that the roller 102 is not in physical contact with the wheel 101 and will not rotate in response to a rotation of the wheel 101. In some embodiments, the flexible arm 104 is configured to maintain the roller 102 in an engaged state with the wheel 101 through application of a continuous force. In some embodiments a spring provides the application of force to maintain the roller 102 in an engaged state. In some embodiments, the roller 102 may transition between the engaged and the disengaged states. In some embodiments, the roller 102 may transition between the engaged and the disengaged states automatically, for example, based at least in part on an energy demand of the vehicle (e.g., an energy demand of a motor of the vehicle) and/or a rotational velocity of the wheel 101. In some embodiments, the roller 102 may transition between the engaged and the disengaged states in response to a user input, such as a driver of the vehicle activating a user input device, such as a button, lever, or switch.

Figure 1C:
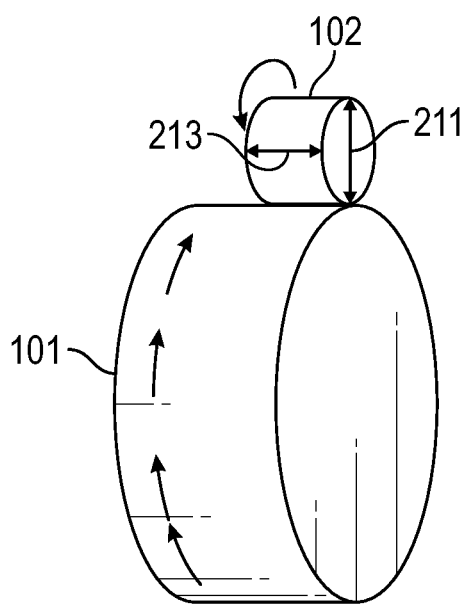
FIG. 1C is a schematic diagram illustrating that a roller of the system can have various dimensions.

FIG. 1C is a diagram illustrating an example embodiment of the roller 102. As shown in FIG. 1C, the roller 102 may comprise a roller width 213 and a roller diameter 211. The roller 102 may have any roller width 213 such as is required or desired. The roller 102 may have any roller diameter 211 such as is required or desired. The roller diameter 211 of the roller 102 may be less than the diameter of the wheel 101 such that the roller 102 rotates at a greater rotational velocity than the wheel 101 in response to a rotation of the wheel 101. In some embodiments comprising multiple rollers, one, some or each of the multiple rollers may have a length and/or diameter that is different than the length and/or diameters of the other rollers.

In some embodiments, the roller 102 may be configured to change a size of roller diameter 211. In response to changing size of roller diameter 211, the roller 102 may rotate at various rotational velocities in response to rotation of the wheel 101 at a single rotational velocity. In some embodiments, the roller 102 may be configured to change size of roller diameter 211 automatically, for example, based at least in part on an energy demand of the vehicle (e.g., an energy demand of a motor of the vehicle) and/or a rotational velocity of the wheel 101.

Figure 1D:
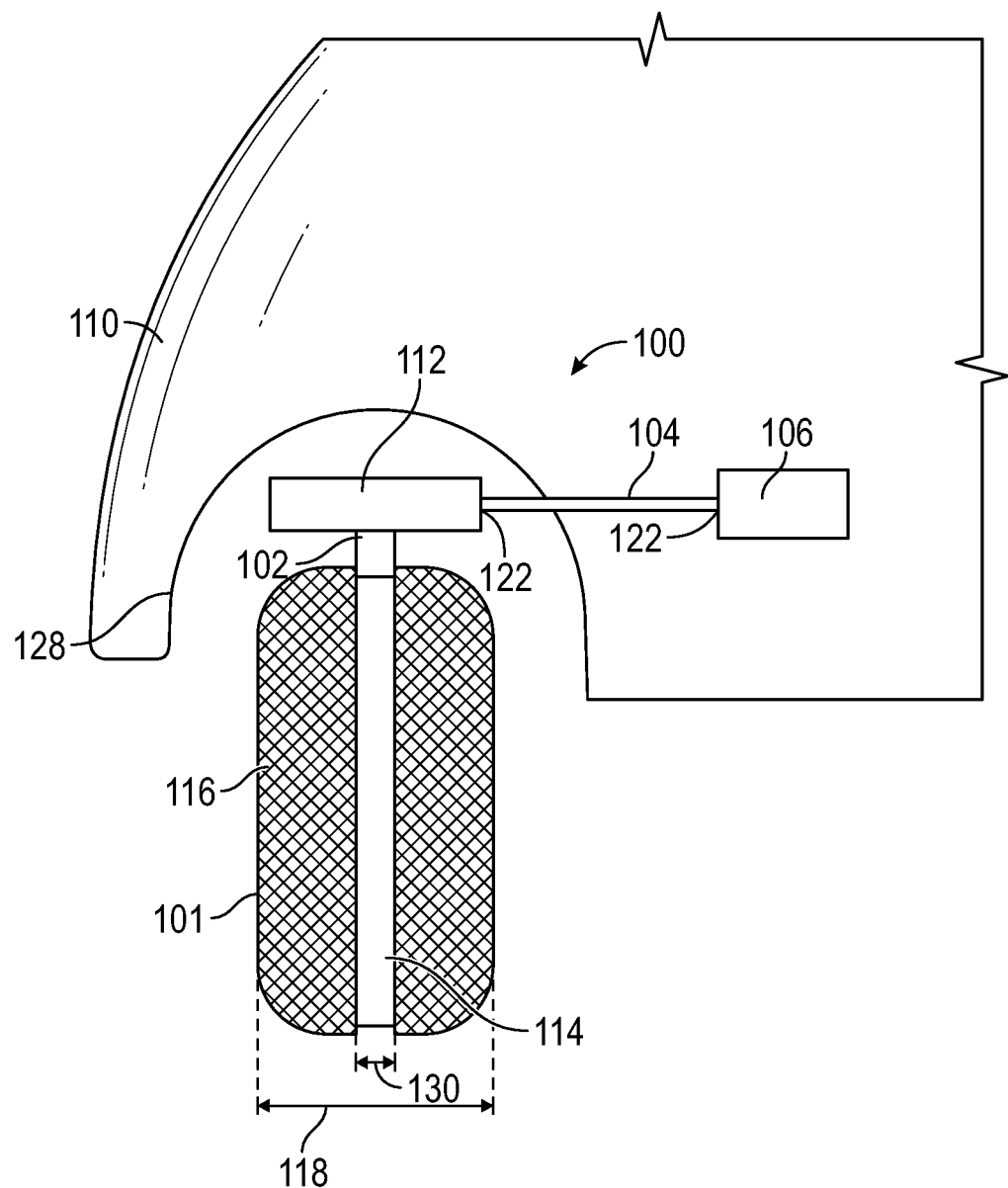
FIG. 1D is a schematic diagram illustrating an example embodiment of the system as installed in a vehicle.

FIG. 1D is an example embodiment of the system or apparatus 100 comprising the flexible arm generator as installed in a vehicle 110. Here, the generator 106 may be located within the vehicle 110 while the roller 102 is located within a wheel well 128 of the vehicle 110. The roller 102 may include a roller housing 112, which houses the roller 102. The flexible arm 104 connects the roller 102 or the roller housing 112 to the generator 106 via several joints 122. Within the wheel well 128, the roller 102 continuously contacts the wheel 101 via a groove 114 that runs along the circumference of the wheel 101.

In an embodiment, the flexible arm 104 may be coupled to the roller 102 located within the roller housing 112. Alternatively, the flexible arm 104 may be coupled to the roller housing 112. In either embodiment, the coupling occurs via a joint 122. In some embodiments the joint 122 may be rigidly fixed, such as a weld or bolt, and not allow for movement between the flexible arm 104 and the roller housing 112. In other embodiments, the joint 122 may be a rotatable coupling such as described in FIG. 1A. In other embodiments, the joint 122 may be a ball and socket joint that allows for 360 degree rotation of the roller housing 112 relative to the flexible arm 104. In other embodiments, the joint 122 may be a universal joint that transmits motion and power from the roller 102 and to the generator 106. In some embodiments discussed further below, the flexible arm 104 is configured to maintain the roller 102 continuously engaged with the groove 114, even in the event that the vehicle 110 encounters uneven terrain during operation.

In some embodiments, the flexible arm 104 may be rotatably fixed to the roller housing 112 and the generator 106. In this embodiment, the rotational movement of the roller 102 would be transferred to the generator 106 through mechanical movement taking place within the roller 102. Such mechanical movement may include a combination of gears and shafts located within the flexible arm 104 and/or roller housing 112 and that span continuously from the roller 102 to the generator 106. In other embodiments, the generator 106 may be located within the roller housing 112 or elsewhere within the wheel well 128. In this embodiment, the roller 102 and/or roller housing 112 may transfer rotational movement directly to the generator 106. A cable may transfer the electrical output produced by the generator 106 to the battery or motor of the vehicle. The flexible arm 104 may house this cable and connect the roller housing 112, generator 106, or both to a feature of the vehicle. This feature may be a structural member of the vehicle 110, an energy storage device 1203 (such as the energy storage devices 1203 illustrated in FIGS. 4, 12A-12J), or motor 1401 (such as the motors 1401 illustrated in FIG. 12A-12J).

In some embodiments, in both the engaged state and the disengaged state the flexible arm 104 exerts a downward force on the roller 102 such that the roller 102 maintains constant contact with the wheel 101. This downward force may be applied directly to the roller 102 or indirectly to the roller 102 through the roller housing 112. The flexible arm 104 operates to keep the roller 102 in contact with the wheel 101 through application of this downward force. Further, the flexible arm 104 may be configured to accommodate any oscillation of the wheel 101 including vertical or horizontal movement. This allows the flexible arm 104 to flex, bend, or move with the wheel 101 while maintaining the downward force exerted on the wheel 101. This movement may include the flexible arm 104 pivoting around a joint 122. Thus, when the wheel 101 moves in relation to the vehicle 110, contact between the roller 102 and the wheel 101 is maintained. This is beneficial in circumstances involving a moving vehicle where the vehicle 110 may encounter bumps, potholes, or other artifacts on a road. Frictional force is a function of the normal force between two objects. Thus, an increase in the downward force on the roller 102 results in an increase in the amount of friction between the roller 102 and the wheel 101. An increase in friction between the roller 102 and the wheel 101 results in an increase in contact between the surface of the wheel 101 and the surface of the roller 102 and a decrease in slippage. An increase in contact between the roller 102 and the wheel 101 results in a greater conversion of rotational movement from the wheel 101 to the roller 102. Thus, the downward force serves to increase the overall energy efficiency of the system.

The term downward force, may be used to signify a force vector, comprising both magnitude and direction, that is normal to, or vertically adjacent to, the earth's surface. The term downward force may also be used to signify a direction that is normal to, or tangentially adjacent to, the plane of contact between the roller 102 and the wheel 101. Further, the magnitude of the force vector may be adjustable while the system or apparatus 100 is in the engaged state. For example, the magnitude or the force may adjust automatically, or via user command. In some embodiments, the magnitude of the force may adjust when the speed of the vehicle changes or when a threshold speed is reached.

In order to accommodate vertical movement of the wheel 101, the flexible arm 104 may be made from a variety of materials, such as but not limited to, metals, polymers, or fiber-based materials. The flexible arm 104 may be comprised of a single component or a combination thereof. These components may bend or flex to accommodate the movement of the wheel 101. Additionally, the flexible arm 104 may be made up of a combination of components made of rigid material that are coupled together via joints or hinges. This combination of components may be similar to that of the suspension of the vehicle. Where the suspension of a vehicle operates to maintain contact between the wheel 101 and the road, the suspension of the flexible arm operates to maintain contact between the roller 102 and the wheel 101.

In some embodiments, the flexible arm 104 is parallel to the rotational axis of the roller 102. As the flexible arm 104 moves in response to movement of the wheel 101, the shape and orientation of flexible arm 104 may change so as to be no longer parallel to the rotational axis of the roller 102. In other embodiments the resting shape of the flexible arm 104 is curved due to the downward force exerted on the wheel 101 through the roller 102. In other embodiments flexible arm 104 is coupled at an angle to the rotational axis of the roller 102 or roller housing 112 such that the angle does not exceed 90 degrees.

As shown, the point of contact between the roller 102 and the wheel 101 may be located at a groove 114 of the wheel 101. The groove 114 is located between the tread 116 of the wheel 101 and spans the outer circumference of the wheel 101. The groove 114 may be located at any point along the width 118 of the wheel 101. As shown in FIG. 1D the groove 114 is positioned at the midpoint of the width 118. The groove width 130 may be substantially equal to the roller width 213 of the roller 102. Further, the cross-sectional shape of the groove 114 may mirror that of the roller 102 to maximize contact between the surface of the roller 102 and the groove 114. The depth of the groove 114 may vary based on the roller diameter 211 and the thickness of the tires. Further, in some embodiments, the surface of the groove 114 may be made of a different material than the surface of the rest of the wheel 101. This material may have a coefficient of friction that is higher or lower than the surface of the rest of the wheel 101. Frictional force is a function of the coefficient of friction of the surface of an object. Thus, an increased coefficient of friction of either the surface of the roller 102 or the wheel 101 results in an increase in the amount of friction between those surfaces and minimize the amount of slippage that occurs between those surfaces. Thus, a groove 114 surface with an increased coefficient of friction would increase the overall energy efficiency of the system. Further, the groove 114 may operate to guide the roller 102 as the wheel 101 rotates and provides an increase in contact area between the roller 102 and the wheel 101. Further, the groove 114 may operate to protect the groove 114 surface. Tires of a vehicle 110 may lose their grip after prolonged contact with a surface. This is seen particularly in automobiles when the tires go bald after prolonged contact with the road. The groove 114 prevents or minimizes contact between the groove 114 surface and outside surfaces, such as a road, thereby preserving the integrity of the groove 114 surface.

In some embodiments, there may be 2 or more grooves 114 located on the wheel 101 that may be spaced apart along the width 118 of the wheel 101. In some embodiments, each groove 114 may accommodate a single roller 102 or multiple rollers 102 where each roller 102 is be spaced along the circumference of the wheel 101. In some embodiments, each roller 102 may be located within a separate roller housing 112, or each roller 102 may be found within a single roller housing 112. Further, in some embodiments, the roller housing 112 may accommodate two or more rollers 102 that are used to contact grooves 114 on two or more wheels 101 located within a wheel well 128. In some embodiments, the two or more rollers 102 contacting the two or more wheels 101 may be located in the same roller housing 112.

Figure 2:
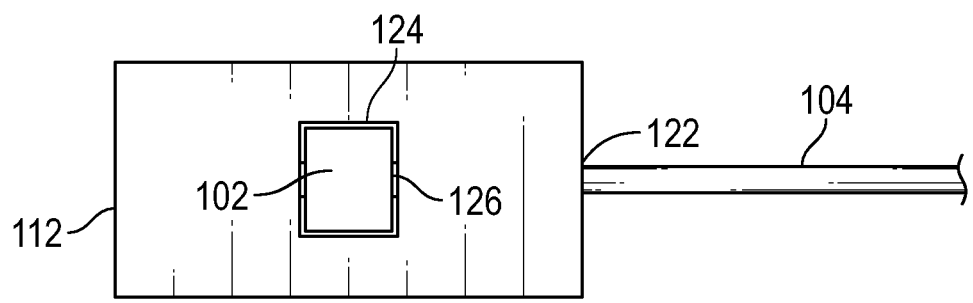
FIG. 2 is a bottom-side view of an example embodiment of a roller housing of the system.

FIG. 2 is a diagram illustrating an example embodiment of the roller housing 112 from the perspective of the wheel 101. As shown in FIG. 2, the roller housing 112 meets the flexible arm 104 at the joint 122. The wheel facing side of the roller housing 112 features a window 124. This window 124 accommodates the roller 102 which is positioned centrally within the window 124. A shaft 126 is attached to the rotational axis of the roller 102 and serves as the point of contact between the to the roller 102 and the roller housing 112. In some embodiments, the shaft 126 is the flexible arm 104. In some embodiments, the shaft 126 is mechanically coupled to the flexible arm 104.

In some embodiments, the window 124 may be shaped in a way to minimize entry of debris into the roller housing 112. To accomplish this, the window 124 may be substantially fitted to the portion of the wheel 101 that extends from the roller housing 112. In some embodiments, there may be a debris repulsion feature located on the perimeter of the window 124. This feature may be brushes that line the inside of the window 124. This feature may be a rubber flap that contacts the roller 102.

Figure 3:
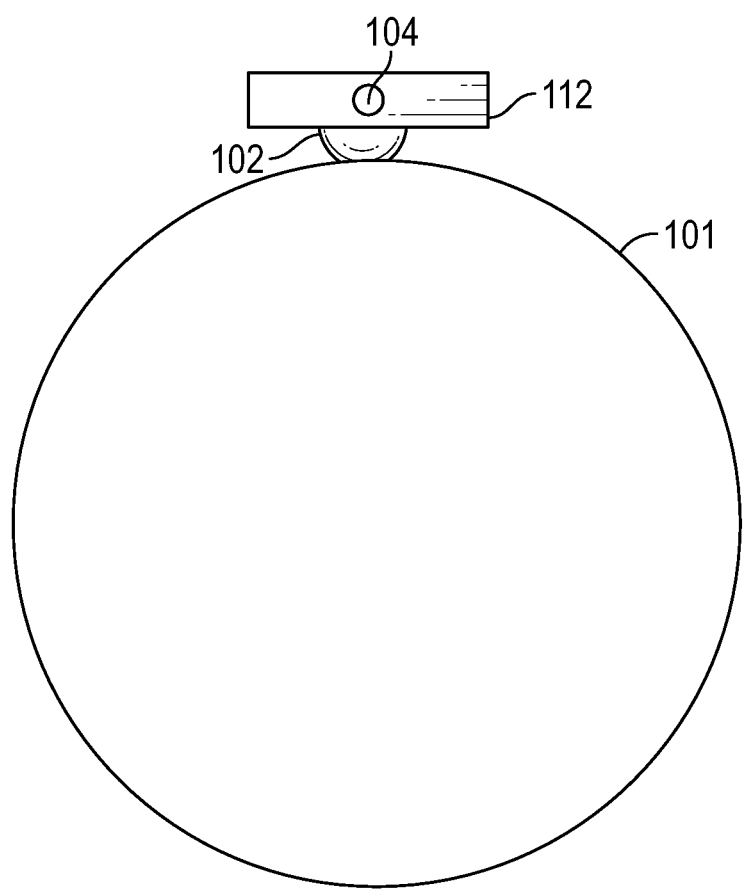
FIG. 3 is a side view of an example embodiment of a roller housing of the system.

FIG. 3 is a sideview of the roller housing 112 from the perspective of the vehicle 110. Here the roller 102 can be seen extending from the roller housing 112 as it contacts the wheel 101. The point of contact between the roller 102 and the wheel 101 is not visible from this perspective as the roller 102 is positioned inside the groove 114 (which cannot be viewed from this perspective). A cross-section of the flexible arm 104 is also visible from this perspective as it meets the roller housing 112. This cross-section can take a variety of orthogonal shapes including but not limited to a circle, oval, and square. The shaft 126 is not visible from this perspective as it is located within the roller housing 112.

Figure 4:
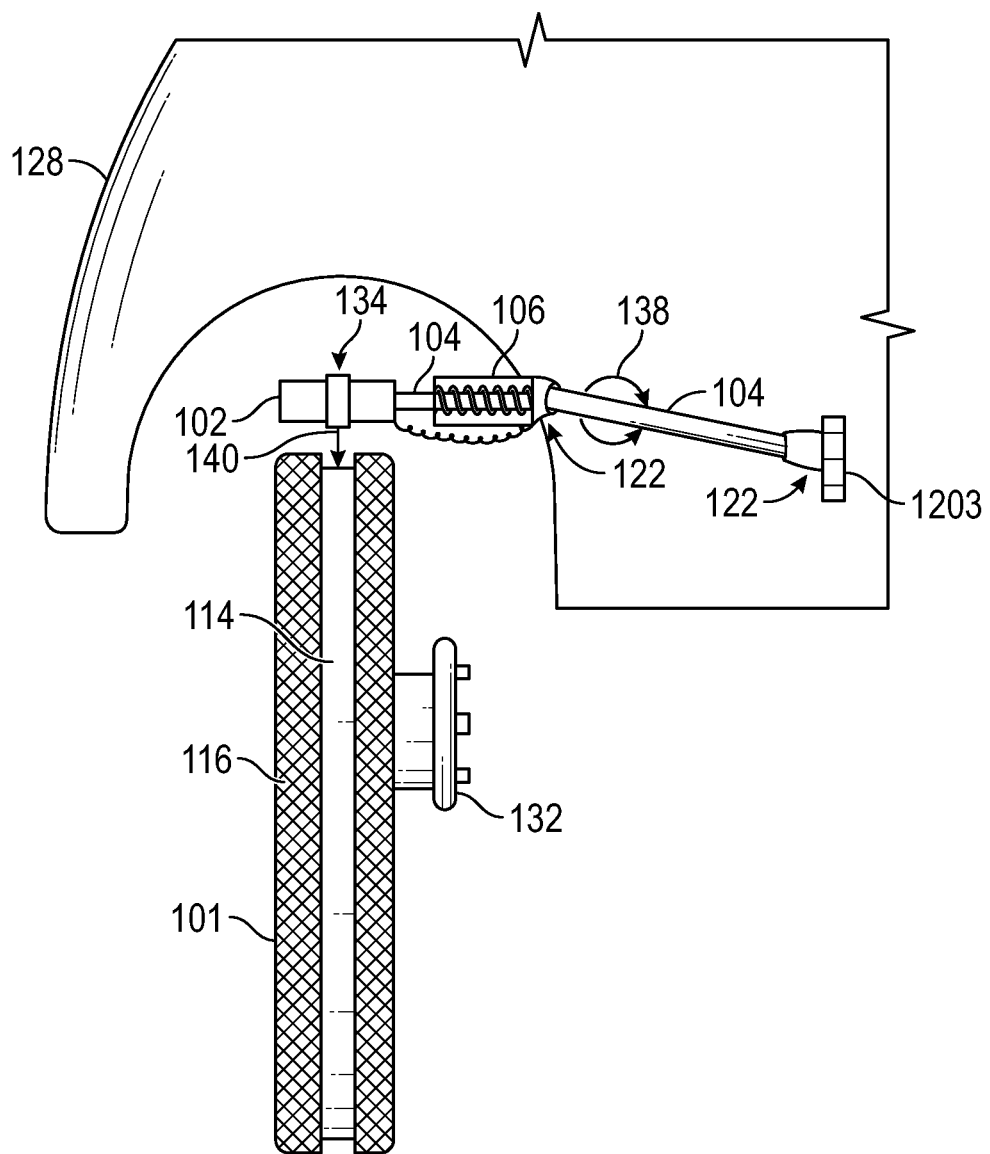
FIG. 4 is a schematic diagram illustrating an example embodiment of the system as installed in a vehicle.

FIG. 4 is a diagram of an example system or apparatus 100 comprising the flexible arm generator in a disengaged state as installed in a vehicle 110. The roller 102 is connected to the generator 106 which in turn is connected to the energy storage device 1203. A flexible arm 104 may connect the roller 102 to the generator 106, and a second flexible arm 104 may connect the generator 106 to the energy storage device 1203. The flexible arm 104 may rotate 138 about its axis as shown. A joint 122 may be used in forming the connection at the ends of the flexible arms 104, generator 106, and the energy storage device 1203. For more detail on the energy storage device 1203 see FIG. 10. A disc brake 132 is shown contacting the wheel 101.

In this embodiment, the roller 102 may take a cylindrical form that contacts the outer surface of the wheel 101 not including the groove 114. The roller 102 may have a raised portion that extends radially and forms a roller bump 134. The roller bump 134 will have a diameter that is larger than the roller diameter 211. The difference between the roller diameter 211 and the diameter of the roller bump 134 shall be substantially equal to the depth of the groove 114 multiplied by a factor of two. The depth of the groove is substantially equal to the distance between the surface of the tire 101 and the surface of the groove 114. The width of the roller bump 134 may be less than or in some embodiments substantially equal to, but not in excess of, the groove width 130. In an engaged state, the roller bump 134 will be lowered as shown by arrow 40 and inserted into the groove 114 to contact the surface of the groove 114.

Figure 5A:
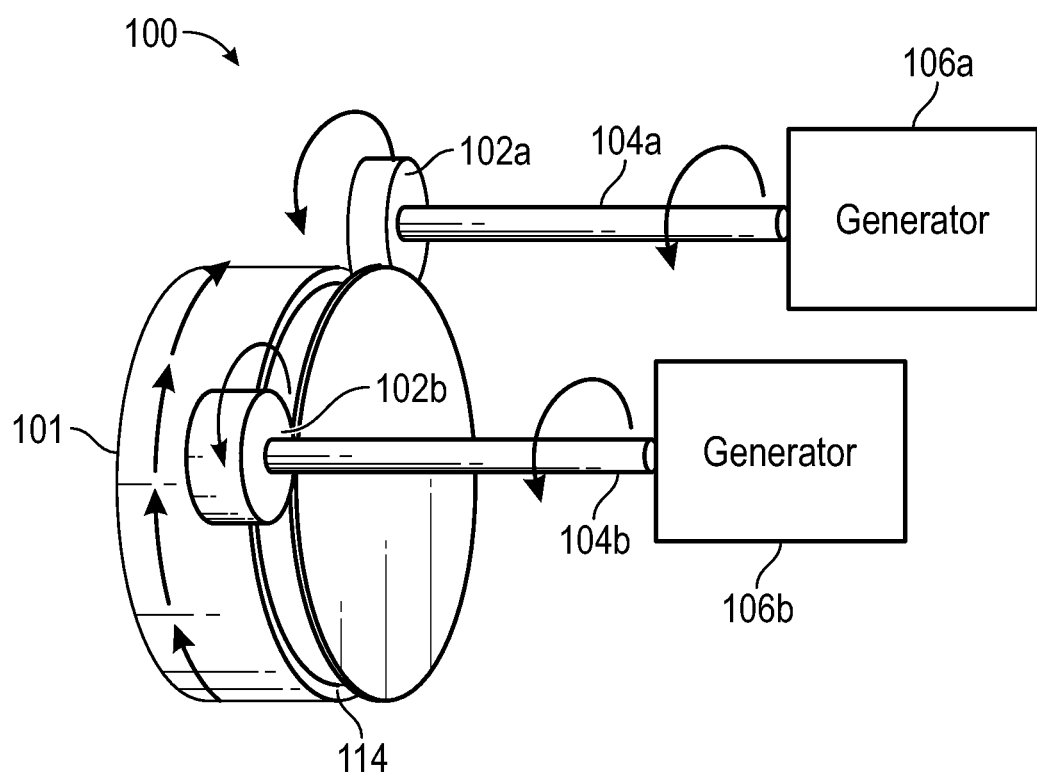
FIGS. 5A-5B are schematic diagrams illustrating example embodiments of the system comprising multiple rollers.

FIG. 5A is a diagram illustrating an example embodiment of the system or apparatus 100 comprising two rollers and two generators. As shown in FIG. 5A, the system 100 may comprise a first roller 102a, a first flexible arm 104a, a first generator 106a, a second roller 102b, a second flexible arm 104b, a second generator 106b, and one or more grooves 114 on the wheel 101. The components of the example embodiment shown in FIG. 5A may comprise similar structural and/or operational features as described with reference to other embodiments described herein, for example, the example embodiment of FIG. 1A-FIG. 4. For example, the rotation of the wheel 101 may cause the rollers 102a/102b to rotate thereby causing flexible arms 104a/104b to rotate thereby causing the generators 106a/106b to generator energy. Each of the flexible arms 104a/104b may exert a downward force on the roller 102. Further, each downward force exerted by each arm may differ in both magnitude and direction when compared to the other arm. FIG. 5A is not meant to be limiting of the present disclosure. The apparatus 100 may comprise any number of rollers, flexible arms and/or generators as required and/or desired.

Figure 5B:
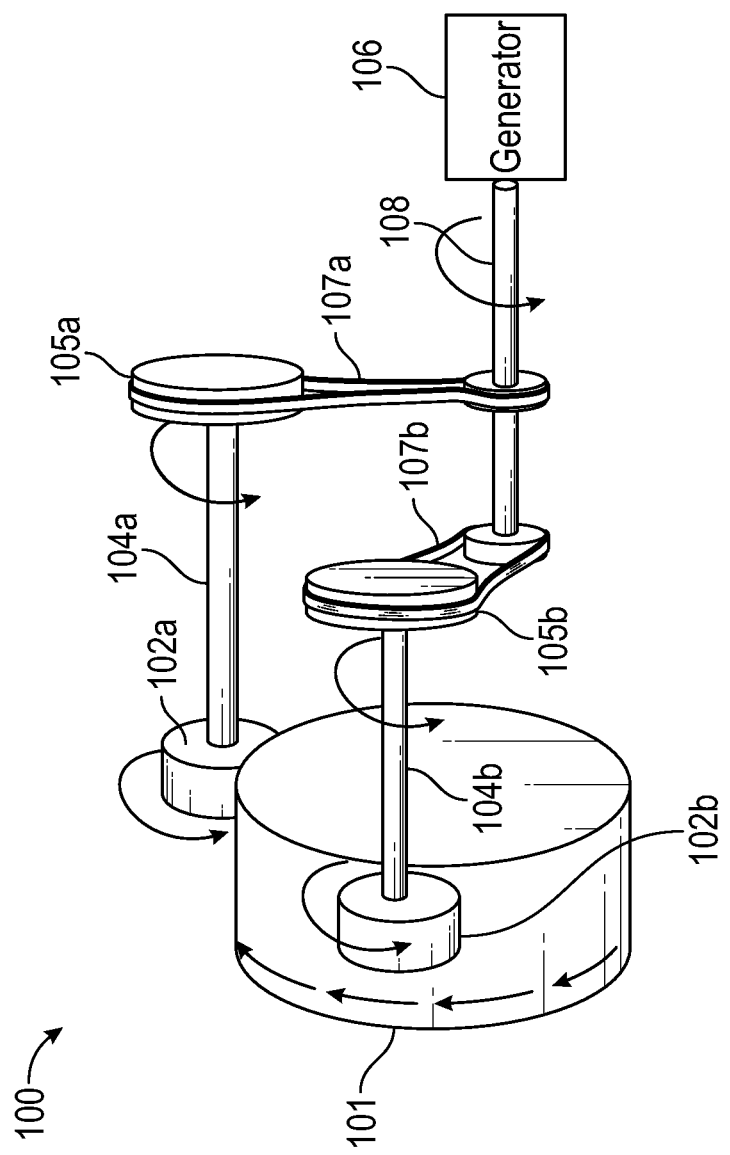

FIG. 5B is a diagram illustrating an example embodiment of the system or apparatus 100 comprising two rollers and a generator. As shown in FIG. 5B, the apparatus 100 may comprise a first roller 102a, a first flexible arm 104a, a first sprocket 105a, a first coupling device 107a, a second roller 102b, a second flexible arm 104b, a second sprocket 105b, a second coupling device 107b, a third flexible arm 108 and generator 106. Although not shown in FIG. 5B, the system 100 may also comprise one or more grooves 114 on the wheel 101 as depicted in FIG. 5A. The components of the example embodiment shown in FIG. 5B may comprise similar structural and/or operational features as described with reference to other embodiments described herein, for example FIG. 1A. The sprockets 105a/105b may be rotatably coupled to the flexible arms 104a/104b and may rotate in response to rotation of the flexible arms 104a/104b. The sprockets 105a/105b may be rotatably coupled to a third flexible arm 108, for example via coupling devices 107a/107b as shown in FIG. 5B. The coupling devices 107a/107b may comprise one or more of a chain, belt, gearing, pulley or the like. The third flexible arm 108 may be operably coupled to the generator 106 such that rotation of the third flexible arm 108 causes the generator to generate energy. Each of the flexible arms 104a/104b/108 may exert a downward force on the roller 102. Further, each downward force exerted by each arm may vary in both magnitude and direction when compared to the other arms. Thus, the generator 106 may generate energy in response to a rotation of the first and/or second rollers 102a/102b.

In some embodiments, the third flexible arm 108 may rotate in response to simultaneous rotations of the first and second rollers 102a/102b. In some embodiments, the third flexible arm 108 may rotate in response to rotation of either the first or second rollers 102a/102b.

In some embodiments, the flexible arms 104a/104b may be fixedly rotatably coupled to the sprockets 105a/105b such that the sprockets 105a/105b can only rotate when the flexible arms 104a/104b rotate. In some embodiments, the sprockets 105a/105b may be configured to rotate when the flexible arms 104a/104b are not rotating, for example, after the flexible arms 104a/104b discontinue rotating, the sprockets 105a/105b may continue to rotate, for example due to rotational inertia. For example, the flexible arms 104a/104b and/or sprockets 105a/105b may comprise a one-way ratchet device that causes the sprockets 105a/105b to rotate when the flexible arms 104a/104b rotate and allows the sprockets 105a/105b to continue to rotate when the flexible arms 104a/104b are not rotating. The sprockets 105a/105b and the third flexible arm 108 may comprise similar operational and/or structural features to allow the third flexible arm 108 to rotate when one or more of the sprockets 105a/105b are not rotating in some embodiments or to cause the third flexible arm 108 to rotate only when the sprockets 105a/105b are rotating in other embodiments.

Figure 6A:
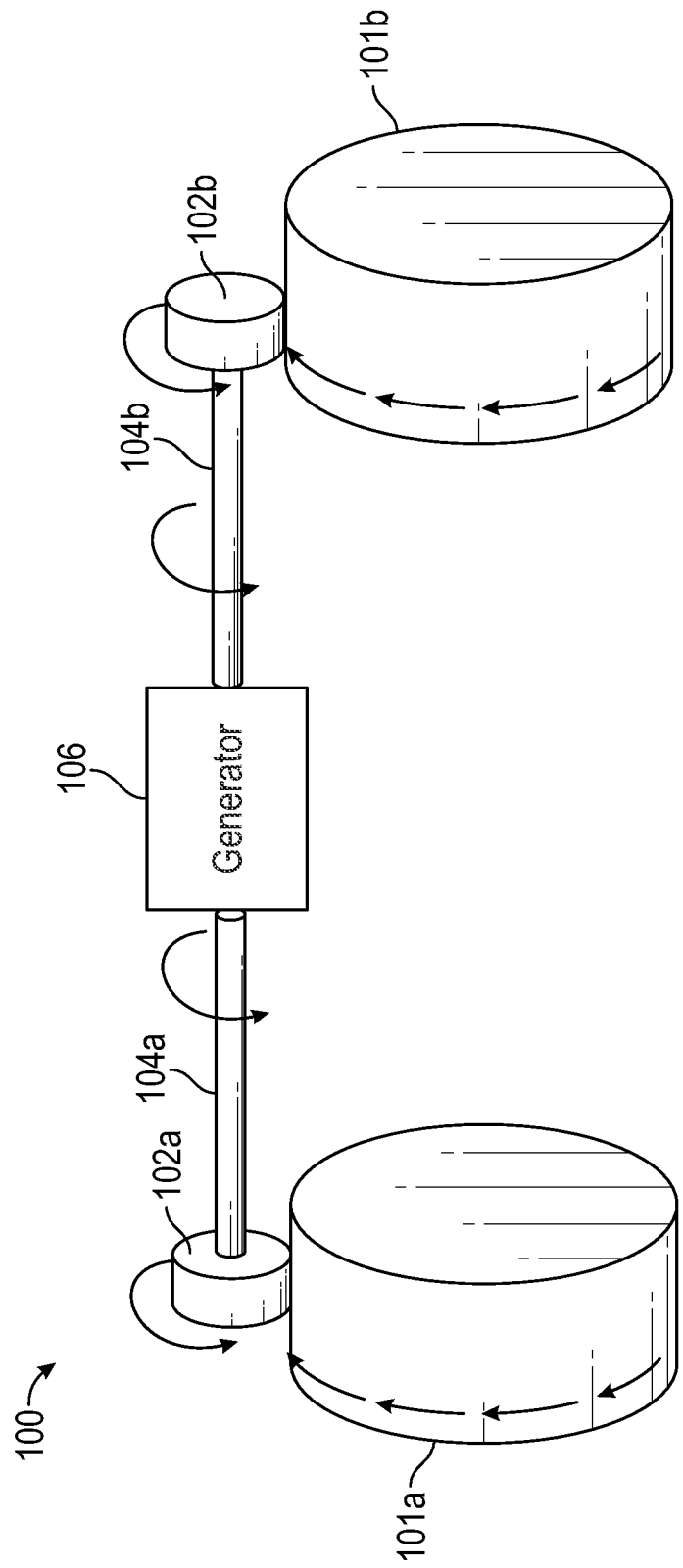
FIGS. 6A-6B are schematic diagrams illustrating example embodiments of the system implemented on multiple wheels of a vehicle.

FIG. 6A is a diagram illustrating an example embodiment of the system or apparatus 100 implemented with multiple wheels of a vehicle. As shown in FIG. 6A, the apparatus 100 may include a first roller 102a rotatably couplable to a first wheel 101a of a vehicle, a second roller 102b rotatably couplable to a second wheel 101b of a vehicle. Although not shown in FIG. 6A, the system 100 may also include one or more grooves 114 on the first and second wheels 101a,101b. The components of the example embodiment shown in FIG. 6A may comprise similar structural and/or operational features as described with reference to other embodiments described herein, for example, the example embodiment of FIG. 1A. For example, rotation of the first and/or second rollers 102a/102b may cause the generator 106 to generate energy.

FIG. 6A is not meant to be limiting of the present disclosure. The apparatus or system 100 may comprise any number of rollers, flexible arms, grooves, and/or generators as required and/or desired and may be implemented on any number of wheels of a vehicle as required or desired, for example on one, two, three or four wheels (for example, with reference to implementation with a car) or 18 wheels (for example, with reference to implementation with a semi-truck).

Figure 6B:
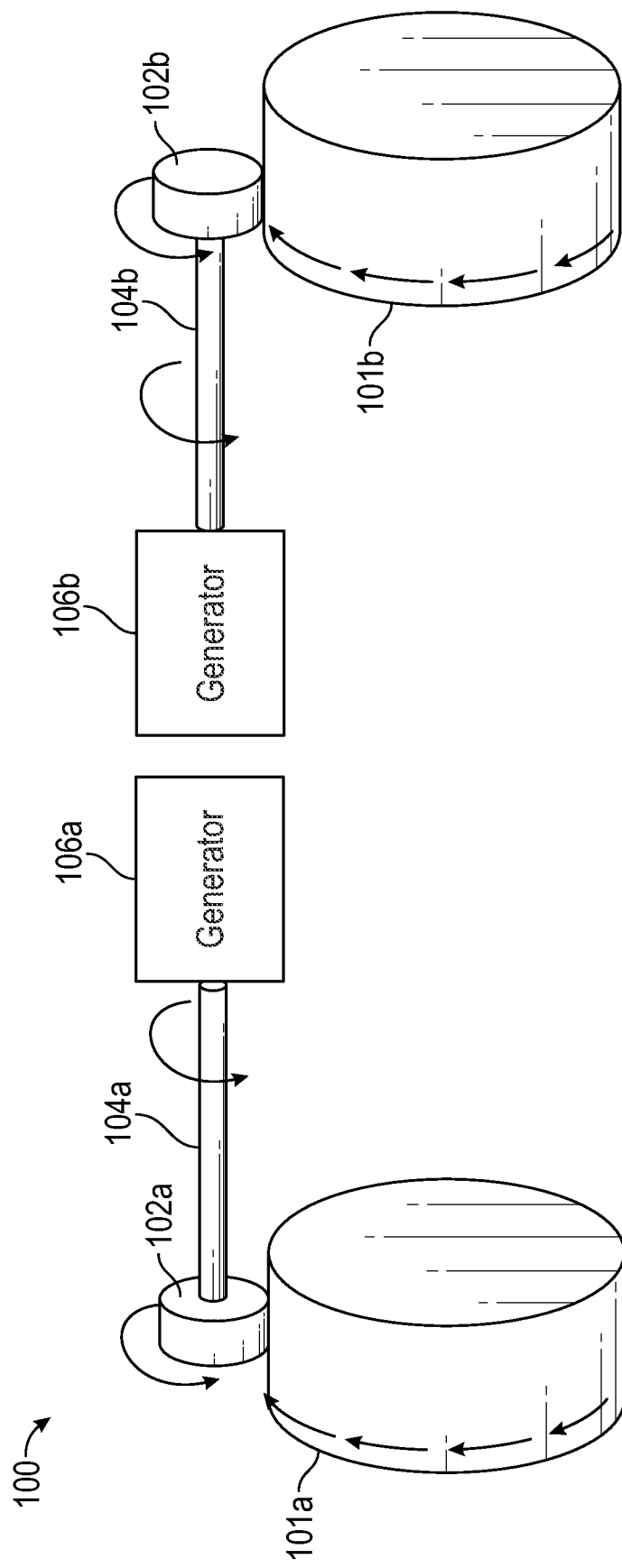

FIG. 6B is a diagram illustrating an example embodiment of the system or apparatus 100 implemented with multiple wheels of a vehicle and comprising multiple generators. As shown in FIG. 4B, the apparatus 100 may comprise a first and second generator 106a/106b. The components of the example embodiment shown in FIG. 6B may comprise similar structural and/or operational features as described with reference to other embodiments described herein, for example, even including multiple grooves 114 on the multiple wheels 101. For example, rotation of the first roller 102a may cause the first generator 106a to generate energy and rotation of the second roller 102b may cause the generator 106b to generate energy. The generators 106a/106b may be in electrical communication with the vehicle and/or each other.

In some implementations, in the engaged state, the rollers 102a, 102b may apply a friction force to the wheel 101 to decelerate the wheel 101. In some implementations, the apparatus 100 may replace a braking system otherwise employed by the vehicle, such that when braking is desired, the rollers 102a, 102b of the apparatus transition to an engaged state thereby applying friction to the wheel 101 to decelerate the rotation of wheel 101 while simultaneously rotating in response to a rotation of the wheel 101 to generate energy at the generator 106 until the wheel 101 stops rotating. This frictional force may be increase by the flexible arms 104a/104b applying a downward force on the rollers 102a,102b. The magnitude of this downward force may be adjusted while the flexible arms 104a,104b are in the engaged state.

The rotational inertia of the rollers 102 in the example embodiment of FIG. 1A and other examples herein can be changed for example increased or decreased. Increasing the rotational inertia of the rollers can cause more or less friction to be applied to the wheel 101 and also cause more or less energy to be generated at the generator 106. For example, more energy would be required to rotate the roller 102 with a high rotational inertia than would be required to rotate the roller 102 with less rotational inertia. Thus, the roller 102 with high rotational inertia could more quickly decelerate the rotation of the wheel 101 while simultaneously causing more energy to be generated at the generator 106 than a roller with lower rotational inertia. For example, when acceleration or a constant speed of the vehicle is desired, the rotational inertia of the roller(s) 102 may be low to apply less friction to the wheel 101 (which may thereby cause less energy to be generated at the generator 106) and when deceleration of the vehicle is desired (e.g., stopping), the rotational inertia of the roller(s) 102 may be high to apply more friction to the wheel 101 (which may thereby cause more energy to be generated at the generator 106). Thus, for any given desired mode of operation of the vehicle (e.g., acceleration, deceleration) a maximum energy may be generated at the generator 106 by changing a rotational inertia of the rollers 102.

In some implementations, the rotational inertia of the rollers 102 can change automatically for example in response to an energy demand of the motor of the vehicle, a rotational velocity of the wheel, and/or desired braking etc. In some implementations, the rotational inertia of the rollers can change in response to a manual user input. The rotational inertia of the roller 102 may be changed by changing a state of the roller 102, the flexible arm 104 (or other coupling device), and/or changing a state of the generator 106. The rotational inertia of the roller may be changed by increasing or decreasing the amount of downward force that the flexible arm 104 exerts on the roller 102.

Figure 7:
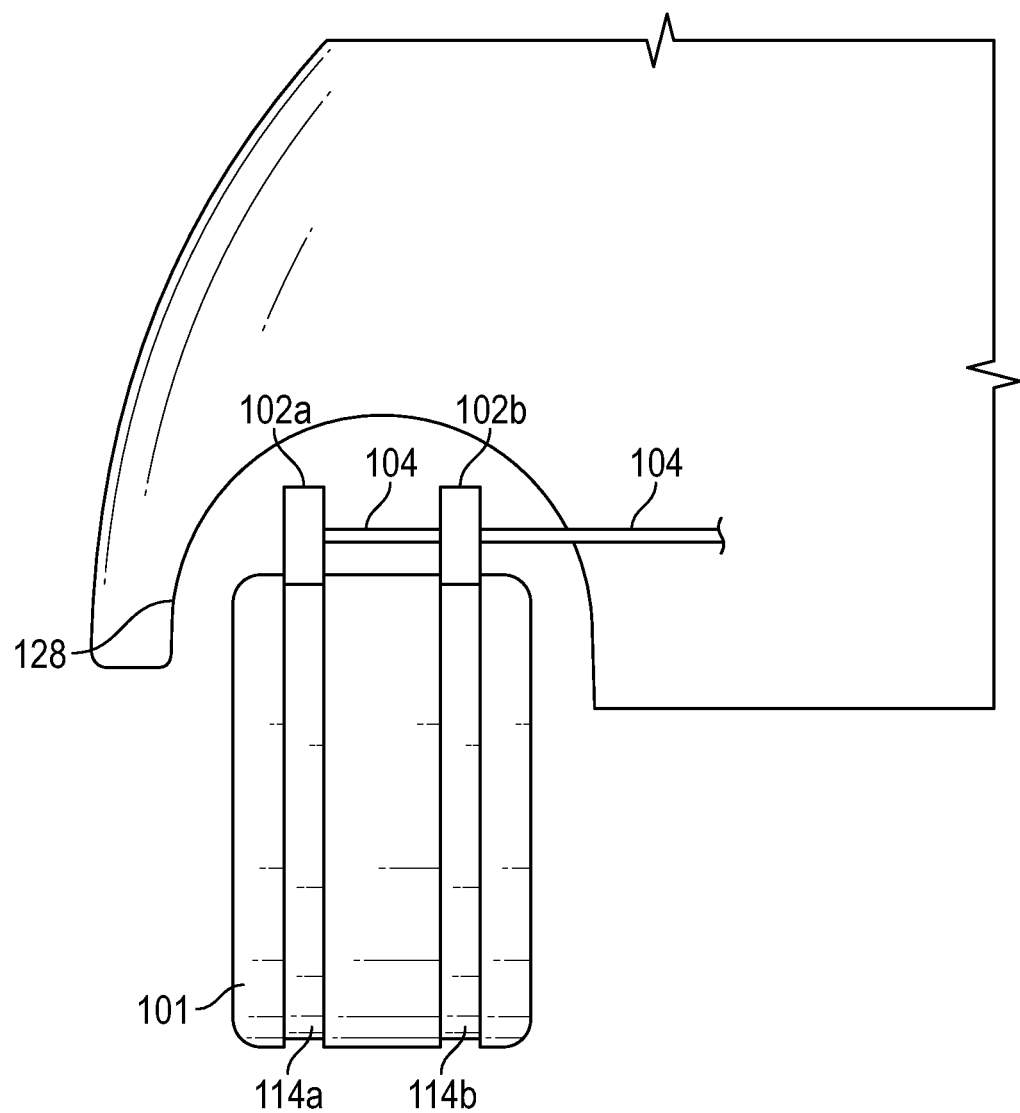
FIG. 7 is a schematic diagram illustrating an example embodiment of the system implemented on multiple grooves on a single wheel.

FIG. 7 is a diagram of an example system or apparatus 100 including a flexible arm generator in an engaged state. This embodiment may include a first roller 102a that is coupled to a second roller 102b where the second roller 102b is coupled to a flexible arm 104. Another flexible arm 104 may couple the first roller 102a and the second roller 102b. In some embodiments, a shaft may couple the first roller 102a to the second roller 102b. In some embodiments, a roller housing 112 may couple the first roller 102a to the second roller 102b.

Additionally, a first groove 114a spans the circumference of the wheel 101 and a second groove 114b spans the circumference of the wheel 101. The first roller 102a may contact the first groove 114a and the second roller 102b may contact the second groove 114b. In other embodiments there may be any number of rollers 102 and any number of accompanying grooves 114.

Figure 8:
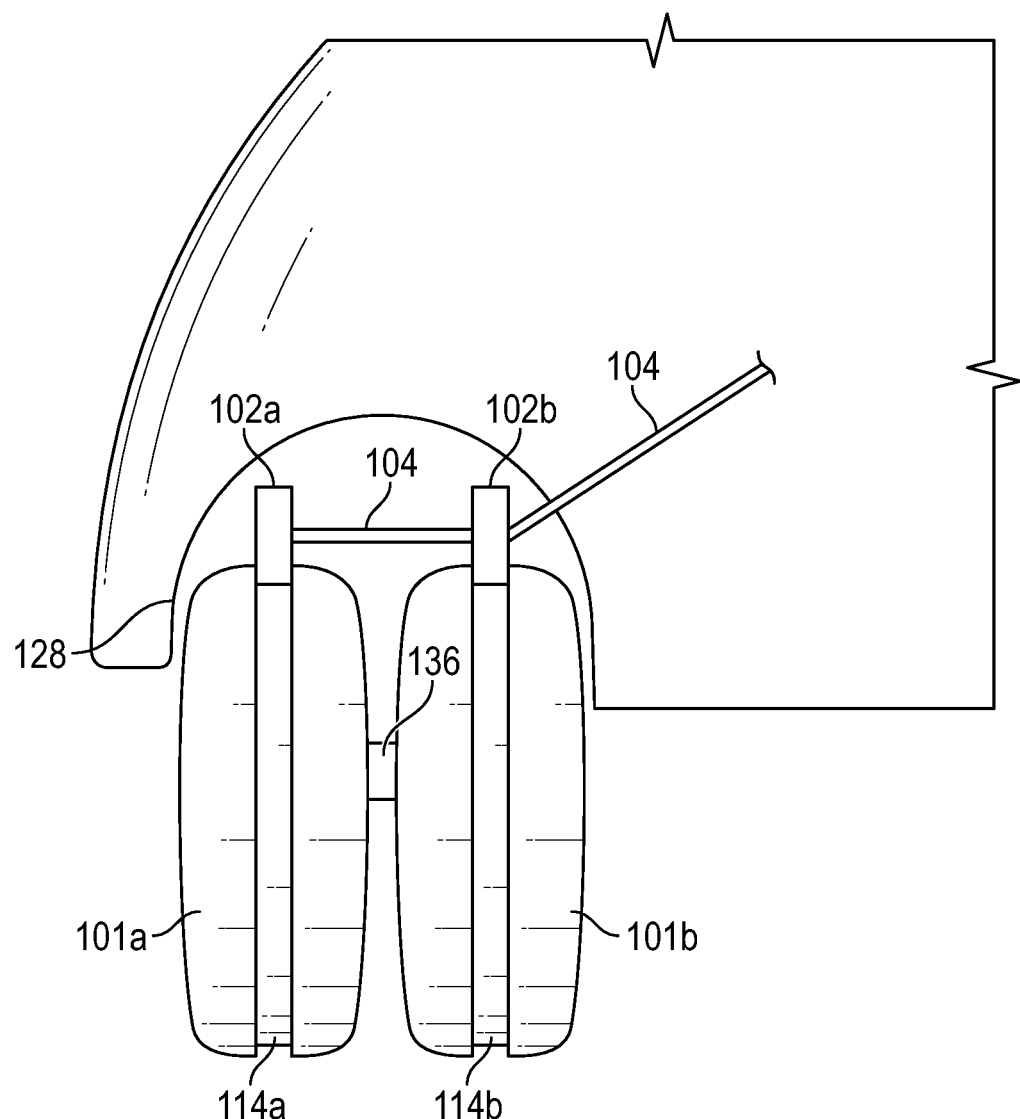
FIG. 8 is a schematic diagram illustrating an example embodiment of the system implemented on multiple wheels in a single wheel well.

FIG. 8 is a diagram of an example system or apparatus 100 including a flexible arm generator in an engaged state. This embodiment may include a first roller 102a coupled to a second roller 102b where the second roller 102b is coupled to a flexible arm 104. Another flexible arm 104 may couple the first roller 102a and the second roller 102b. In some embodiments, a shaft may couple the first roller 102a to the second roller 102b. In some embodiments, a roller housing 112 may couple the first roller 102a to the second roller 102b.

Additionally, a first groove 114a spans the circumference of a first wheel 101a and a second groove 114b spans the circumference of a second wheel 101b. Both wheels 101a, 101b may be located in a single wheel well 128 and connected via an axel 136. The first roller 102a may contact the first groove 114a and the second roller 102b may contact the second groove 114b. In other embodiments there may be any number of rollers 102 and any number of accompanying wheels 101 and grooves 114. In some embodiments, each of the wheels 101 may have multiple grooves 114.

Example Energy Generation and Storage Systems

Figure 9A:
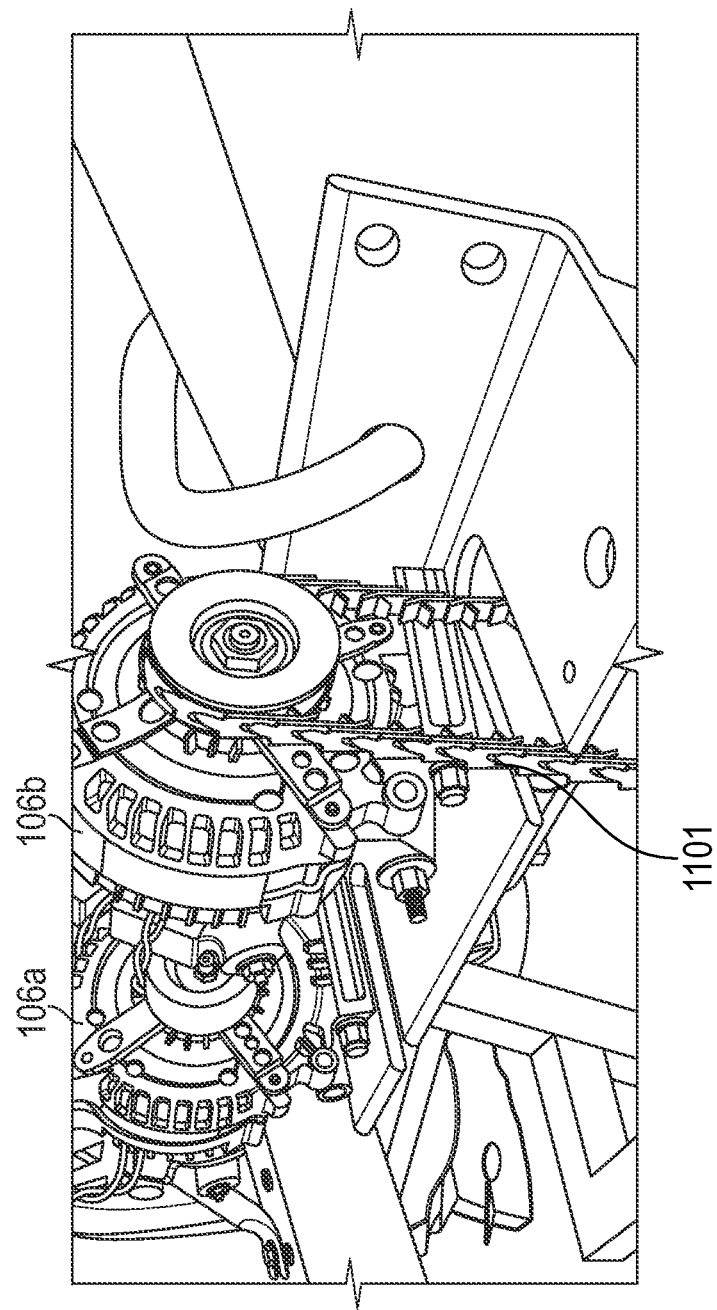
FIGS. 9A-9B is a diagram illustrating examples embodiments of generators coupled to roller(s) of the system.

FIG. 9A is a diagram of two generators 106a and 106b configured to be mechanically coupled to roller(s) and that convert mechanical rotation of roller(s) 102 into electrical energy outputs, in accordance with an exemplary embodiment. In some embodiments, the generators 106a and 106b may be replaced with alternators or similar electricity generating devices. The generators 106a and 106b can be mechanically coupled to roller(s) via one or more of a shaft, linkage, gear, pulley, chain, belt, sprocket or other similar mechanism or device. The example embodiment of FIG. 9A illustrates the generator 106b as mechanically coupled to roller(s) 102 via at least a chain 1101. The chain 1101 may rotate, in response to rotation of the roller(s) 102, causing a corresponding rotor of the generator 106b to rotate and causing the generator 106b to generate an electrical energy output via a cable (not shown in this figure). In some embodiments, the two generators 106a and 106b may be replaced by any number of generators 106, from a single generator to many generators. In some embodiments, the generators 106 may generate AC electricity or DC electricity, depending on the application. When the generators 106 generate AC power, an AC-to-DC converter may be used to condition and convert the generated electricity for storage. When the generators 106 generate DC power, a DC-to-DC converter may be used to condition the generated electricity for storage.

Figure 9B:
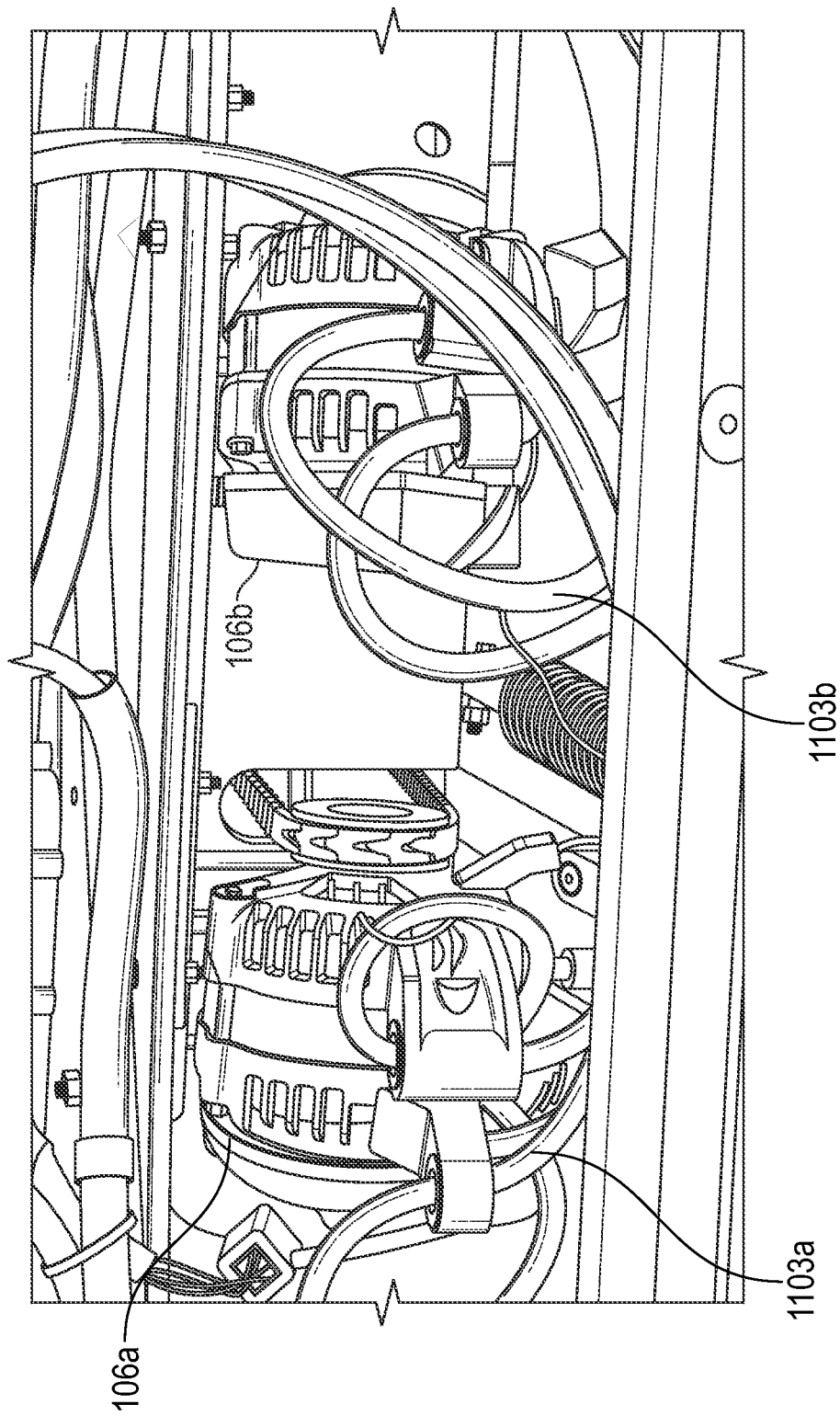

FIG. 9B is an alternate view of the two generators 106a and 106b of FIG. 9A and cabling 1103a and 1103b that couples the generators 106a and 106b to a charger (e.g., a battery and/or capacitor charger) and/or to an energy storage device such as a battery and/or capacitor. The charger may comprise one or more other components or circuits used to rectify or otherwise condition the electricity generated by the generators 106a and 106b. For example, the one or more other components or circuits may comprise one or more of a matching circuit, an inverter circuit, a conditioning circuit, a rectifying circuit, a conversion circuit, and so forth. The matching circuit may match conditions of a load to the source (for example, impedance matching, and so forth). The conversion circuit may comprise a circuit that converts an alternating current (AC) signal to a direct current (DC) signal, a DC/DC conversion circuit, a DC/AC conversion circuit and so forth. The conditioning circuit may condition a signal input into the conditioning circuit, and the rectifying circuit may rectify signals.

Additional details regarding FIGS. 9A-9B can be found in U.S. Patent Publication No. 2021/0313121, which is hereby incorporated by reference in its entirety.

Figure 10:
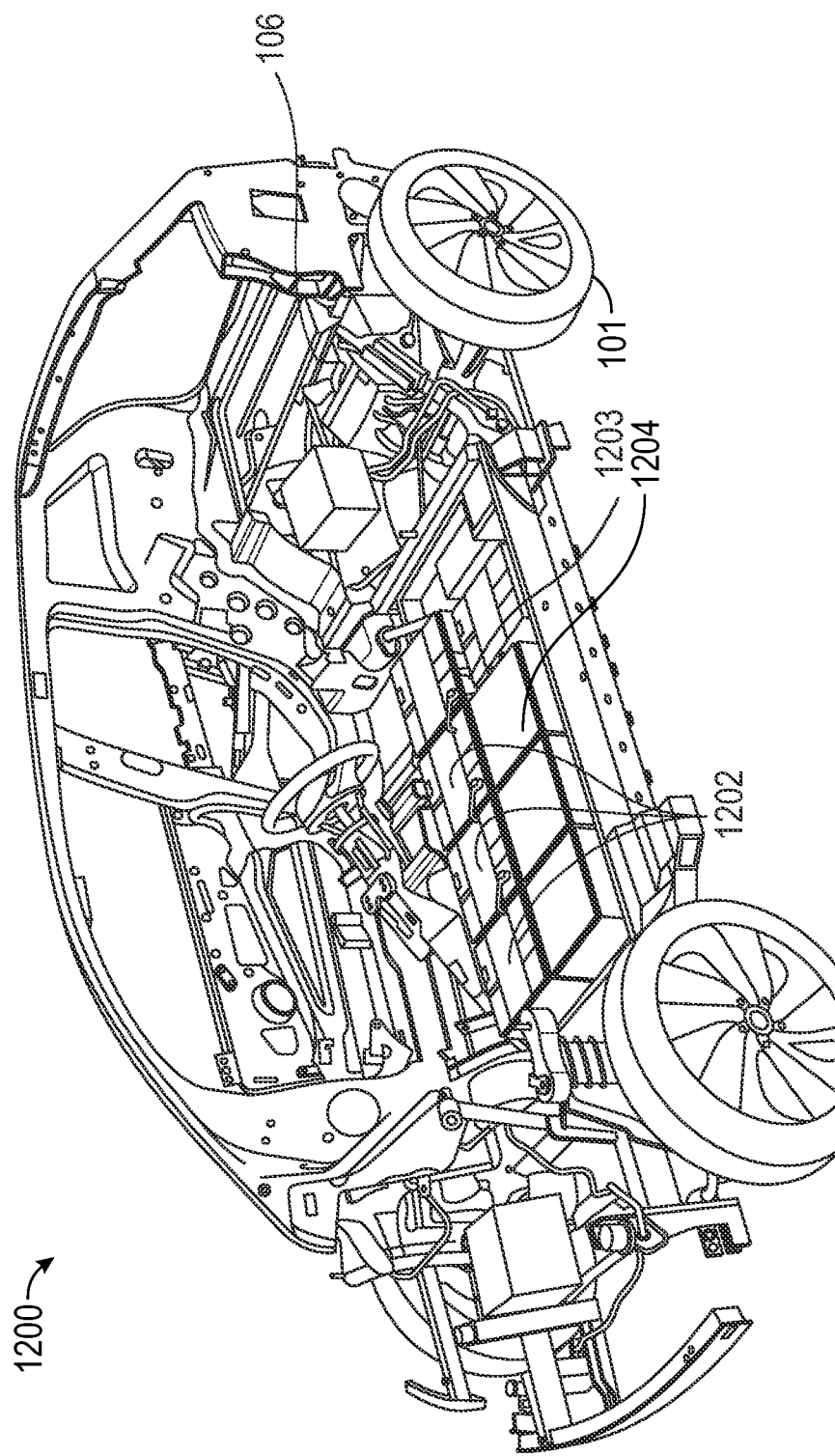
FIG. 10 is a diagram illustrating an example vehicle incorporating the system, a generator and an energy storage device.

FIG. 10 is a diagram of an example vehicle 1200 incorporating an apparatus 100 comprising roller(s) 102, a generator 106, as well as an energy storage device 1203 electrically coupled with the generator 106. Energy generated at the generator 106, in response to a rotation of the roller(s) 102 can be provided to the energy storage device 1203. The energy storage device 1203 can comprise one or more batteries 1202 and/or one or more capacitor modules 1204. The energy storage device 1203 may comprise the one or more capacitor modules 1204 as a supplemental and/or intermediate energy storage device. In some embodiments, the capacitor modules 1204 are disposed alongside the one or more batteries 1202. The capacitor modules 1204 and the battery 1202 can be electrically coupled to at least a motor of the vehicle, such as an electric motor.

In some embodiments, the capacitor modules 1204 may be used in combination with the battery 1202. For example, as shown in FIG. 10, the vehicle 1200 may include one or more the capacitor modules 1204 installed alongside the battery 1202. In some embodiments, the vehicle 1200 includes a plurality of capacitor modules 1204. In some embodiments, one or more batteries 1202 are replaced with one or more capacitor modules 1204. As shown, the capacitor modules 1204 may be connected in series or in parallel with the battery 1202, dependent on the use case. For example, the capacitor modules 1204 may be connected in series or parallel with the battery 1202 when supplementing the voltage in the battery 1202 or when charging the battery 1202 and/or the capacitor modules 1204. Therefore, the battery 1202 and the capacitor modules 1204 may provide voltage support to each other. As such, the capacitor modules 1204 may provide supplemental energy when the battery 1202 are discharged or be used in place of the battery 1202 altogether.

Figure 11:
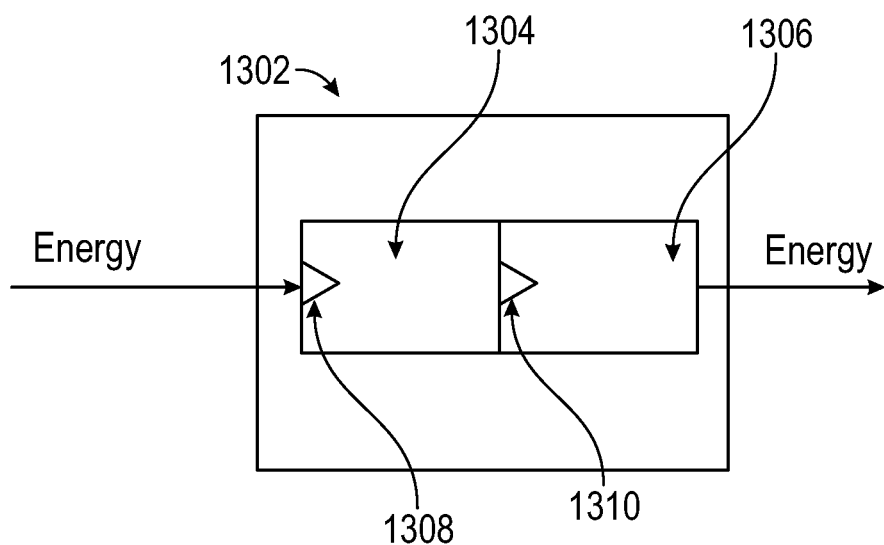
FIG. 11 is a diagram illustrating an example embodiment of a hypercapacitor as an energy storage device.

In some embodiments, the energy storage device 1203 may comprise one or more hypercapacitors. FIG. 11 schematically illustrates a diagram of an example embodiment of a hypercapacitor 1302 for storing energy (e.g., such as may be used in an electric vehicle), which may also be referred to as a hypercapacitor energy storage system or device. As shown, the hypercapacitor 1302 may comprise or consist essentially of an ultracapacitor portion 1304, an energy retainer portion 1306, one or more inbound diodes 1308, and one or more outbound diodes 1310. In some embodiments, the hypercapacitor 1302 may not comprise the inbound diode 1308 and/or the outbound diode 1310.

The ultracapacitor portion 1304 may be electrically coupled to the energy retainer portion 1306 and in some embodiments, together may comprise a single integrated unit or package (e.g., the hypercapacitor 1302). The ultracapacitor portion 1304 may provide energy to the energy retainer portion 1306 as the energy in the energy retainer portion 1306 is depleted (for example resulting from an energy demand at a load).

The electrical connection between the ultracapacitor portion 1304 and the energy retainer portion 1306 may stabilize the voltage levels of the ultracapacitor portion 1304 and prevent self-discharge as the energy retainer portion 1306 retains energy provided from the ultracapacitor portion 1304 via their electrical connection. Advantageously, stabilizing the voltage levels in the ultracapacitor portion 1304 by reducing and/or substantially eliminating self-discharge provides a superior energy device capable of storing energy (e.g., maintaining high voltage levels) for much longer than existing energy devices in widespread use today.

The ultracapacitor portion 1304 of the hypercapacitor 1302 may comprise one or more ultracapacitors and/or supercapacitors. The ultracapacitor portion 1304 may incorporate structural and operational features described in connection with any of the embodiments of the capacitor module 1204 described herein.

The energy retainer portion 1306 may comprise a device or multiple devices capable of storing energy such as a battery, a battery field and/or a capacitor. For example, in some embodiments the energy retainer portion 1306 may include a battery such as the battery 1202 described herein and may incorporate structural and operational features of the battery 1202. In some embodiments, the energy retainer portion 1306 may include a battery field such as a battery field comprising batteries 1202 such as shown in FIG. 10. In some embodiments, the energy retainer portion 1306 may comprise one or more capacitors, such as the capacitor module 1204 described herein.

Additional details regarding FIG. 11 can be found in U.S. Publication No. 2021/0313121, which is hereby incorporated by reference in its entirety.

Figure 12A:
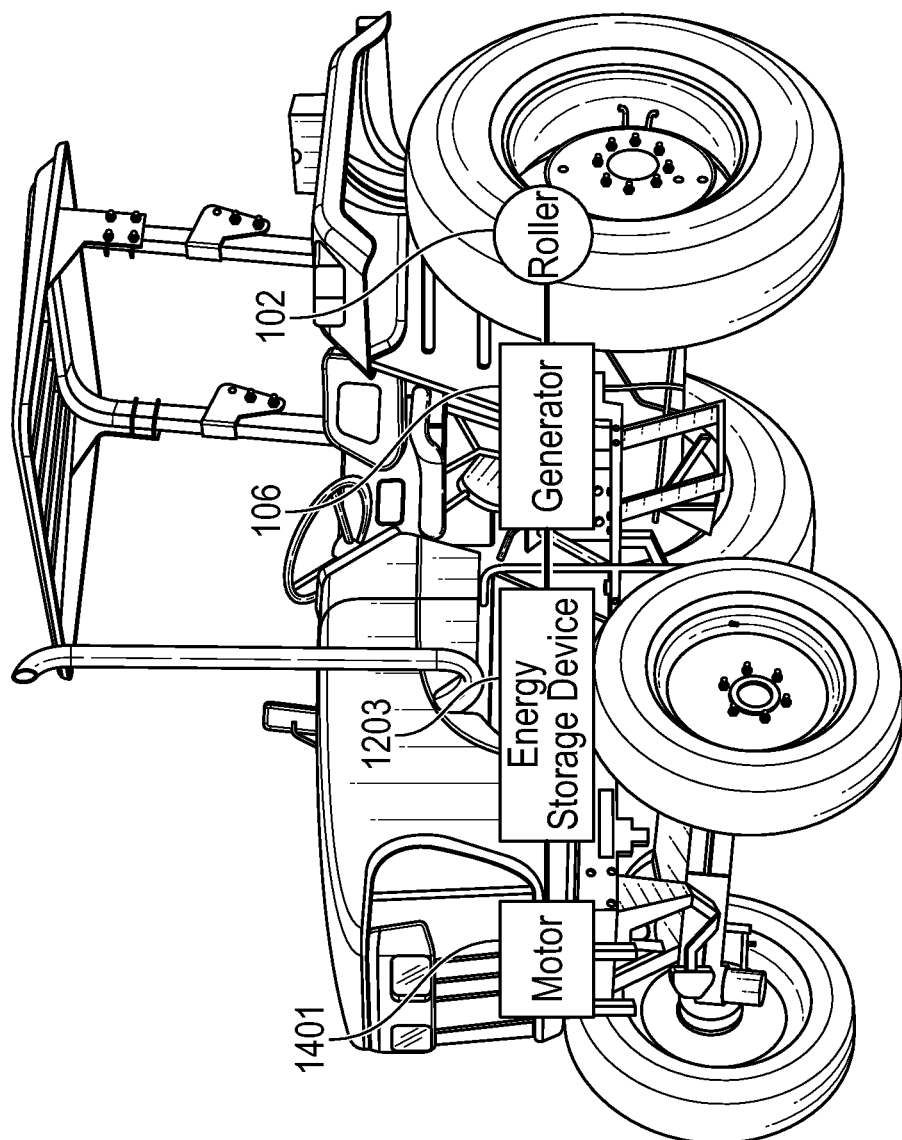

FIG. 12A illustrates an example farm equipment such as a tractor that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12A, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

FIG. 12B illustrates an example construction equipment that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12B, the system may further comprise a flexible arm 104 and one or more grooves 114 on the wheel or tread. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12C:
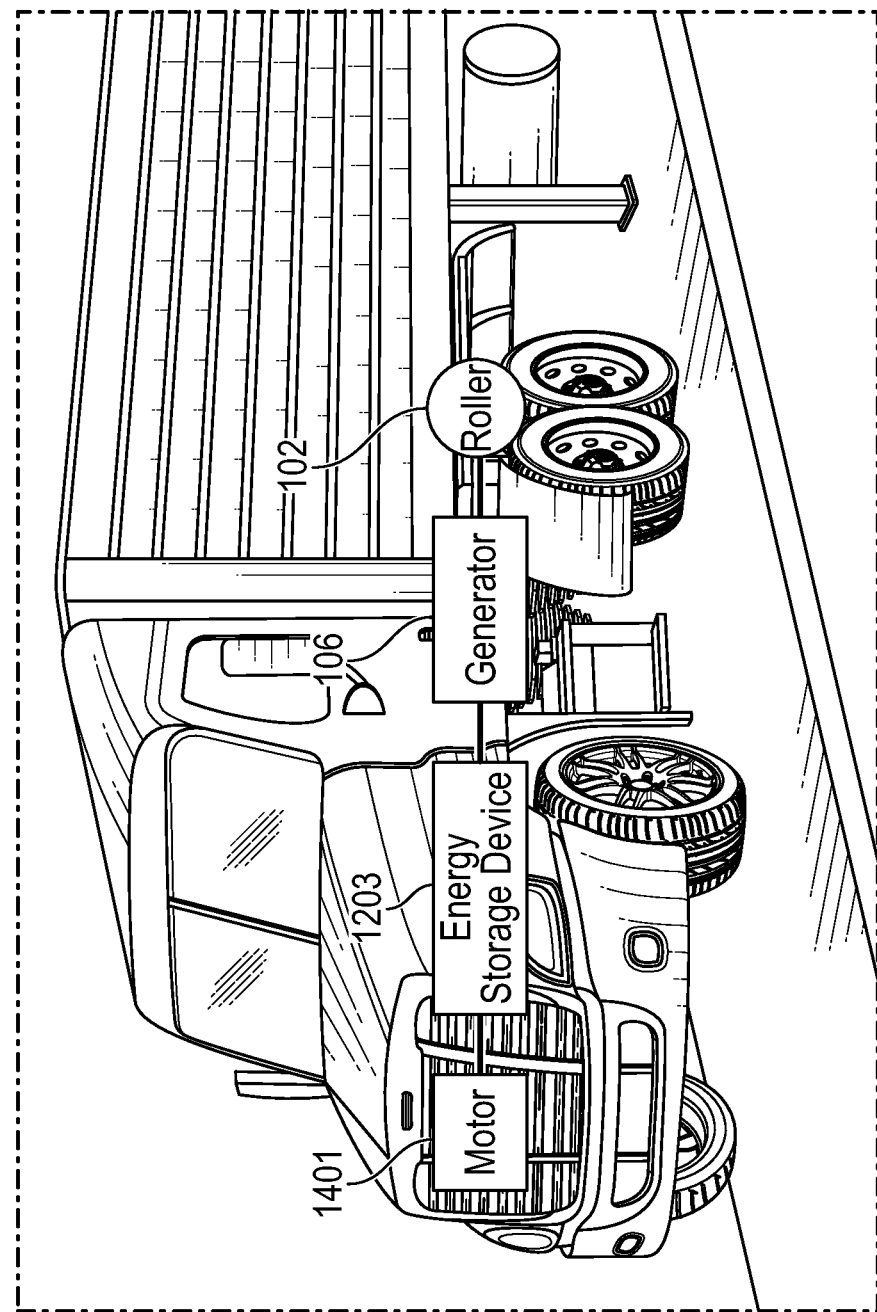

FIG. 12C illustrates an example commercial vehicle such as a tractor-trailer or semi-truck that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12C, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12D:
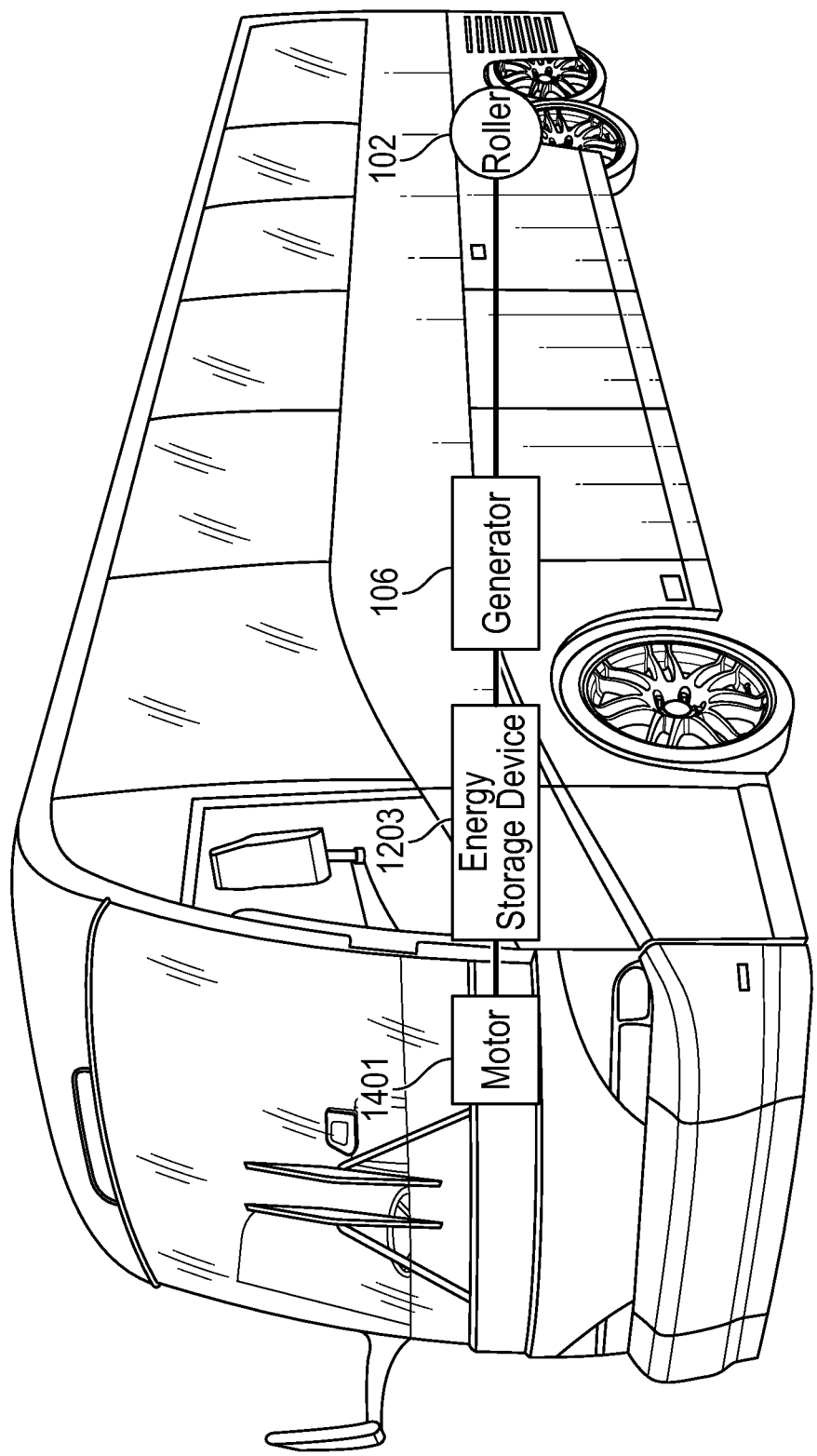

FIG. 12D illustrates an example bus that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12D, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12E:
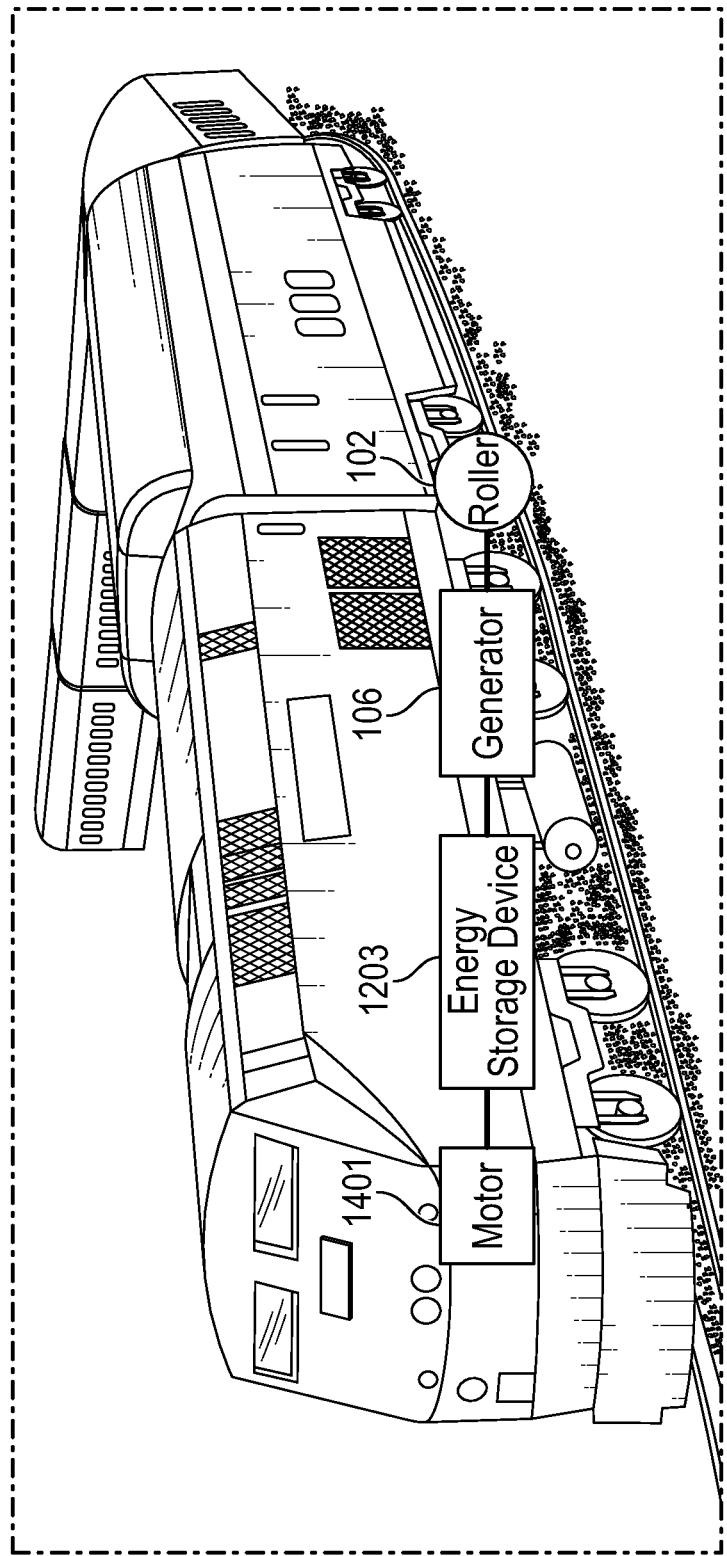

FIG. 12E illustrates an example train that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12E, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12F:
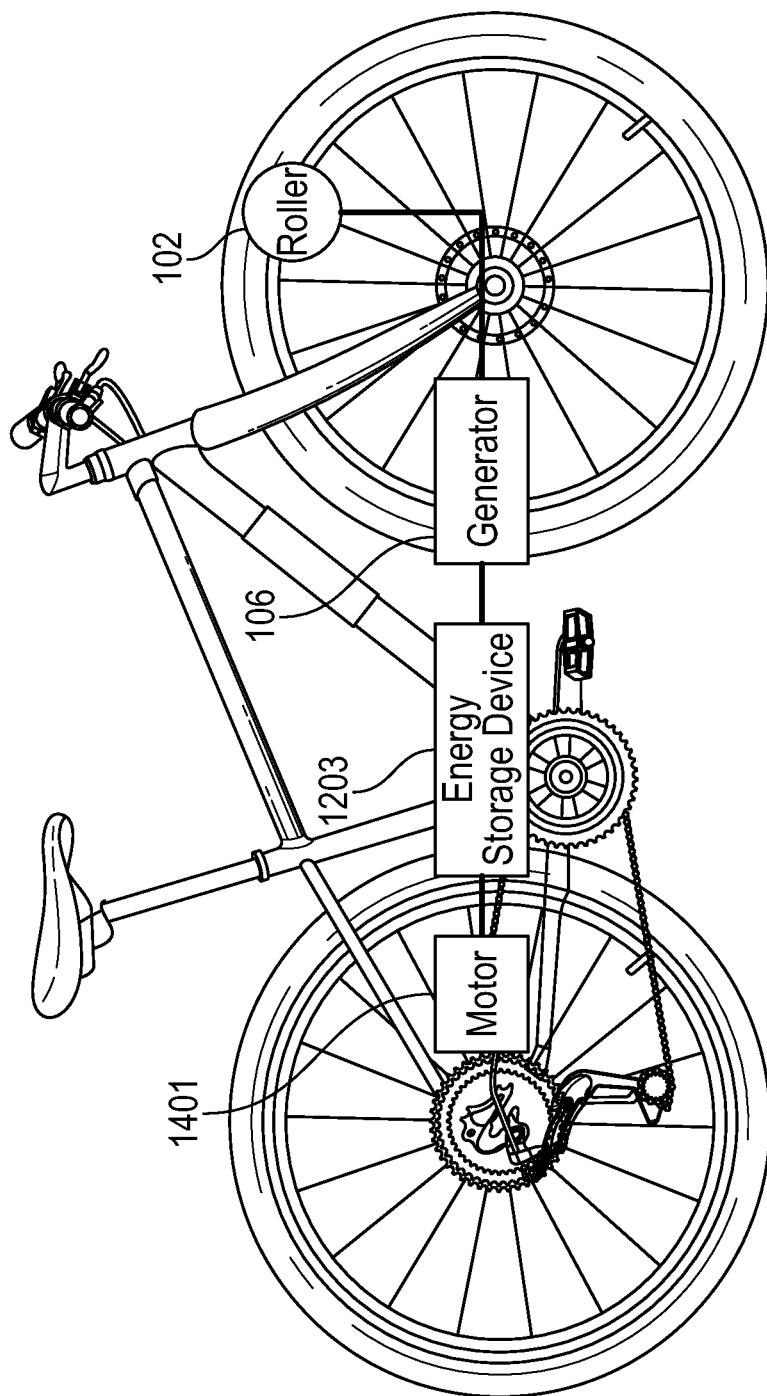

FIG. 12F illustrates an example bicycle that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12F, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12G:
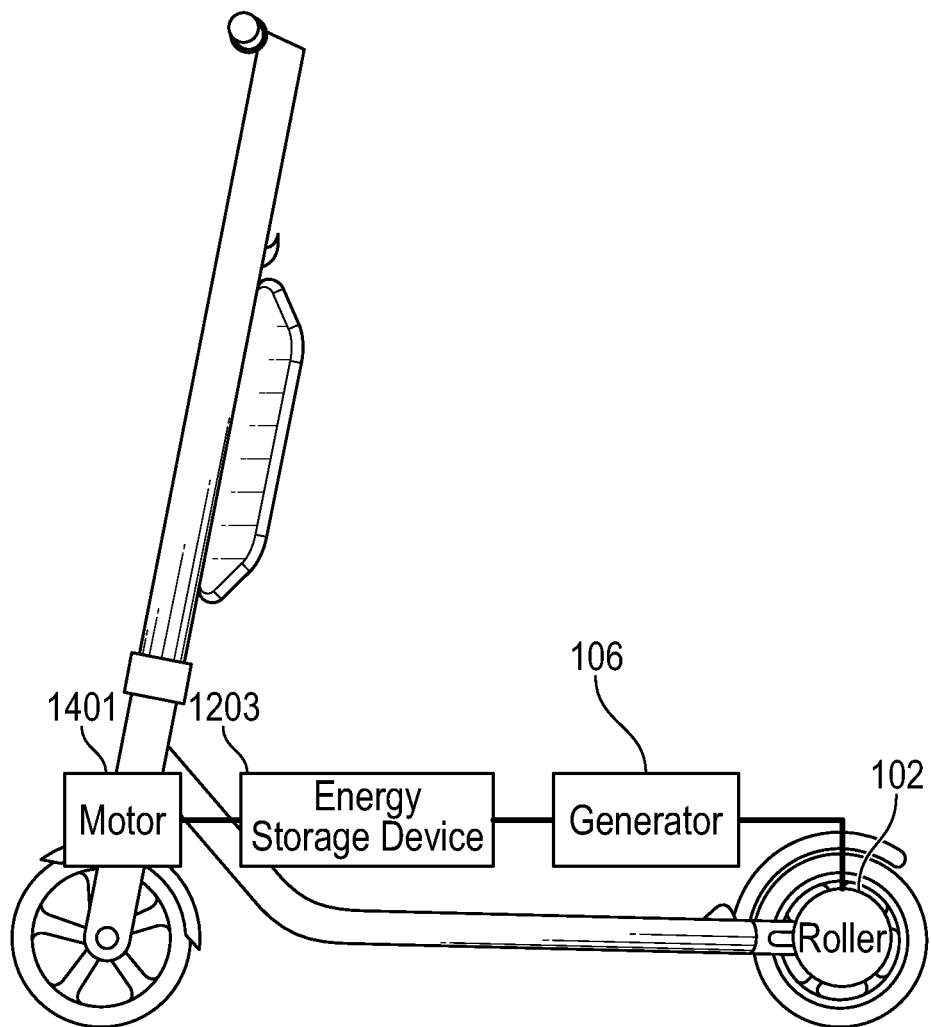

FIG. 12G illustrates an example scooter that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12G, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12H:
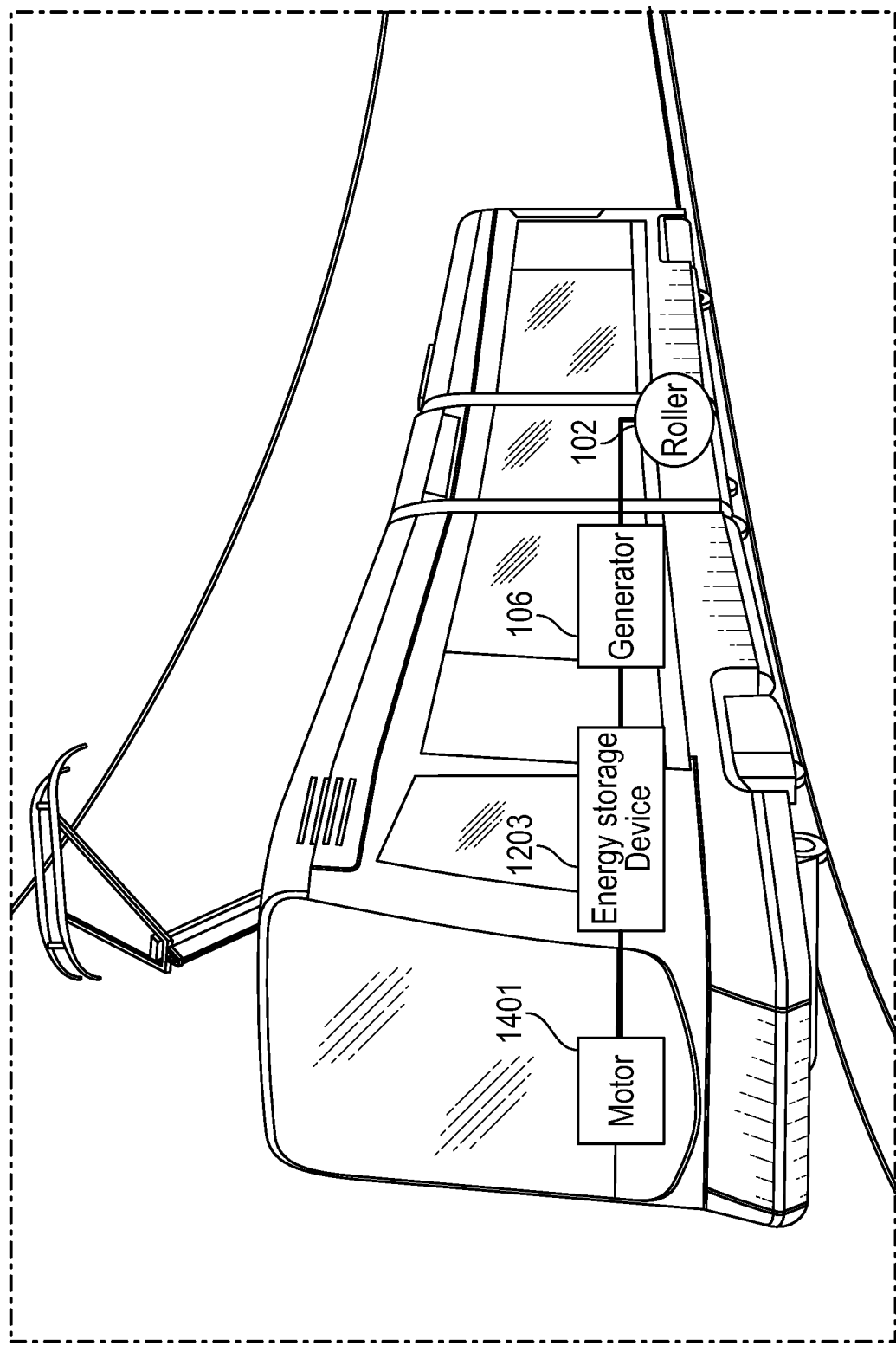

FIG. 12H illustrates an example tram that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12H, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12I:
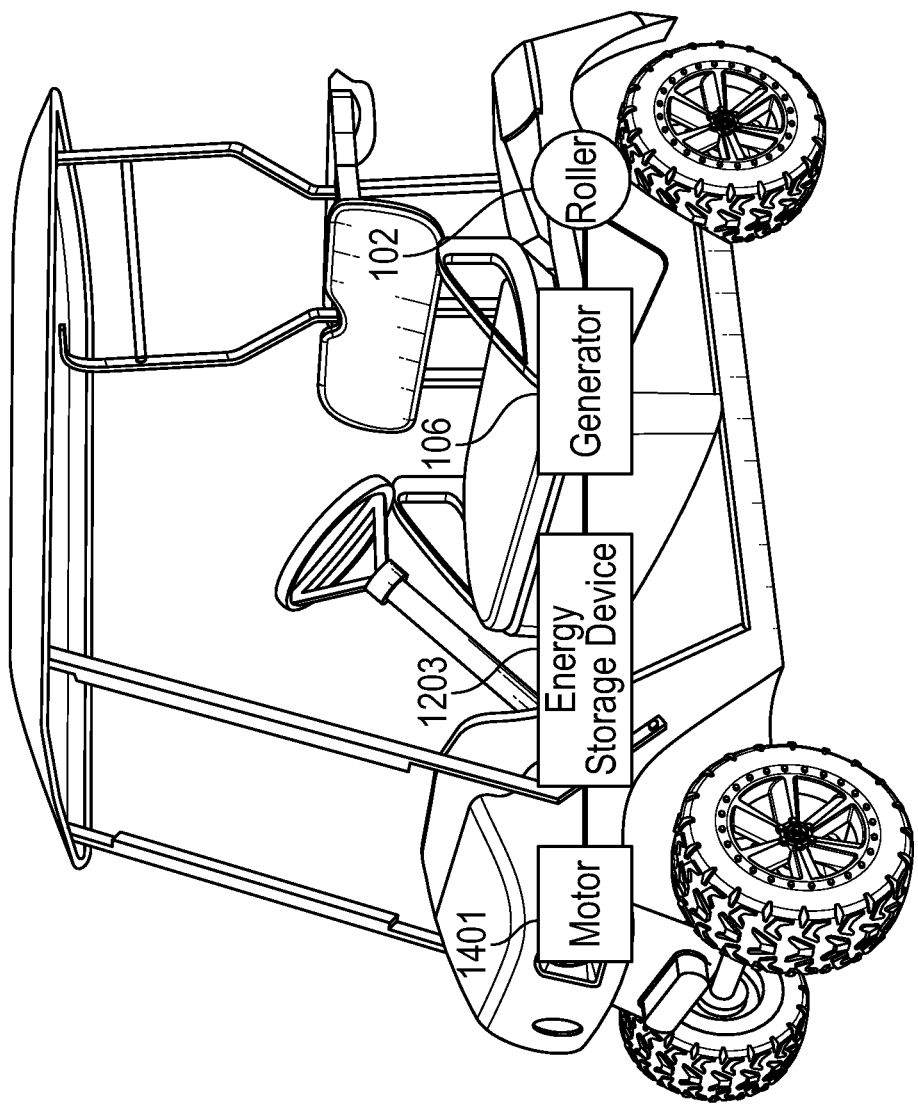

FIG. 12I illustrates an example cart such as a golf cart that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12I, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Figure 12J:
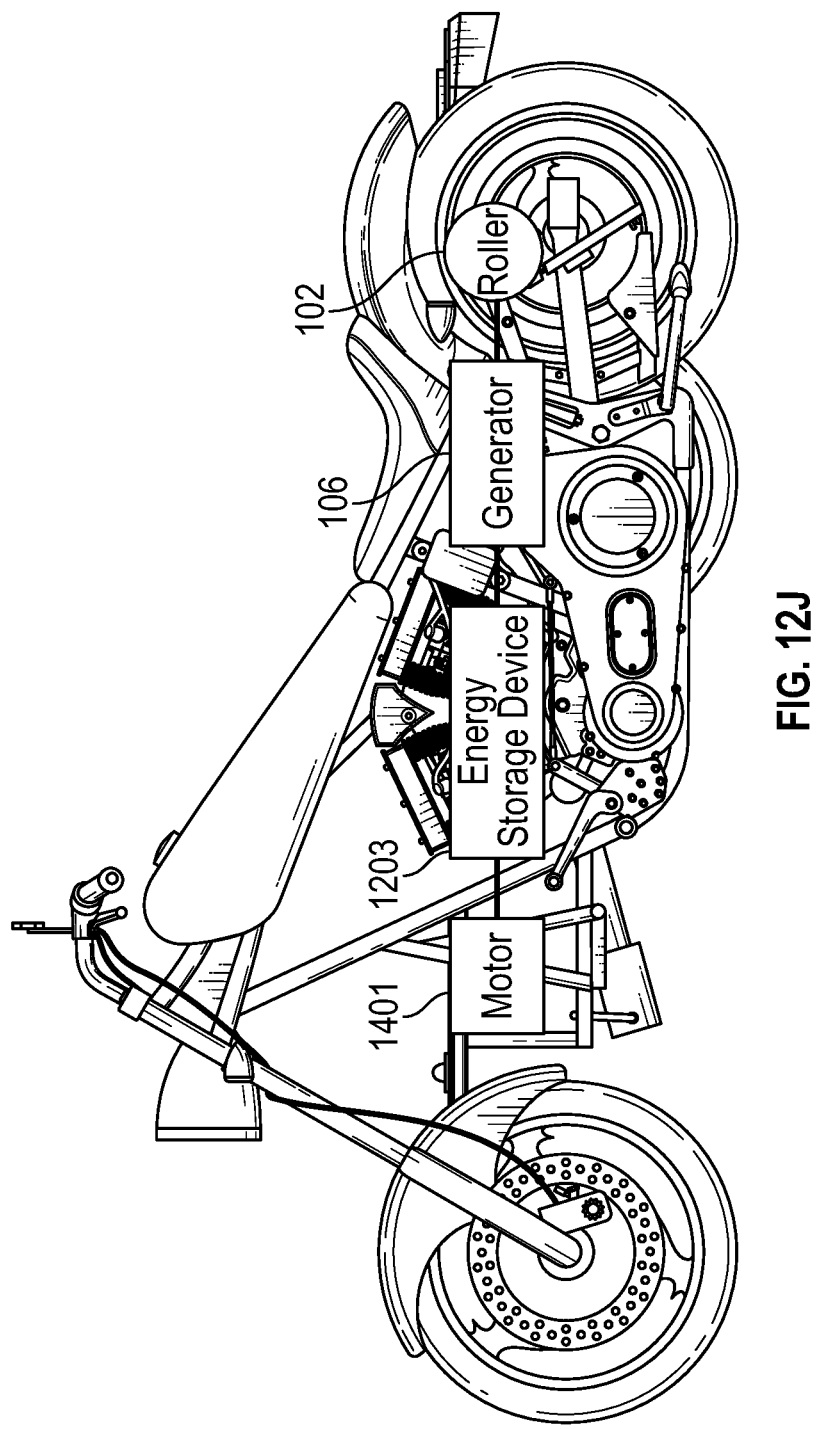

FIG. 12J illustrates an example motorcycle that may incorporate the various components and systems discussed herein such as the apparatus 100, which may comprise a generator 106 and one or more rollers 102 rotatably couplable to a wheel of the vehicle, as well as a motor 1401, such as an electric motor, and an energy storage device 1203 which may comprise a capacitor 1204, a battery 1202 and/or a hypercapacitor 1302, as discussed herein. Although not included in FIG. 12J, the system may further comprise a flexible arm 104 and one or more grooves 114 on the wheels. The generator 106 may be electrically coupled to the energy storage device 1203 and may be capable of providing energy to the energy storage device 1203, as discussed herein. The energy storage device 1203 may be electrically coupled to the motor 1401 and may be capable of providing energy to the motor 1401.

Additional Embodiments

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various illustrative logical blocks and modules described in connection with the embodiments disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described embodiments, the elements of which are to be understood as being among other acceptable examples. All such modifications and variations are intended to be included herein within the scope of this disclosure. The section headings used herein are merely provided to enhance readability and are not intended to limit the scope of the embodiments disclosed in a particular section to the features or elements disclosed in that section. The foregoing description details certain embodiments. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed:

1. A system for generating energy in response to a vehicle wheel rotation, wherein the system comprises:
    one or more wheels, each of the one or more wheels including a groove, each groove located between a tread of each wheel and spanning an outer circumference of each wheel;
    one or more rollers configured to:
        contact the grooves; and
        rotate in response to a rotation of the wheels,
            wherein a portion of each of the one or more rollers is configured to fit within the grooves;
    a generator rotatably coupled to each roller and configured to generate energy in response to a rotation of each of the rollers; and
    one or more flexible arms mechanically connected to the one or more rollers and configured to apply a force to each roller.

2. The system of claim 1, wherein the one or more flexible arms alternate between an engaged state wherein rotating the one or more rollers causes the one or more flexible arms to rotate, and a disengaged state wherein rotating the one or more rollers does not cause the one or more flexible arms to rotate.

3. The system of claim 1, wherein the one or more rollers alternate between an engaged state wherein the one or more rollers contact the one or more wheels, and a disengaged state wherein the rollers do not contact the one or more wheels.

4. The system of claim 1, wherein the one or more wheels is a tread.

5. The system of claim 1, wherein the vehicle is a car, truck, or bus.

6. The system of claim 1, wherein the vehicle is a tractor.

7. The system of claim 1, wherein the vehicle is a rail vehicle.

8. The system of claim 1, wherein the vehicle is a bicycle.

9. The system of claim 1, wherein the vehicle is a scooter.

10. The system of claim 1, wherein the vehicle is a golf cart.

11. The system of claim 1, wherein the vehicle is a motorcycle.

12. A system for generating energy in response to a vehicle wheel rotation, wherein the system comprises:
    one or more wheels, each of the one or more wheels including a groove, each groove located between a tread of each wheel and spanning an outer circumference of each wheel;
    one or more rollers configured to:
        contact the grooves; and
        rotate in response to a rotation of the wheels,
            wherein a portion of each of the one or more rollers is configured to fit within the grooves;

one or more generators, wherein each generator is rotatably coupled to one of the one or more rollers and configured to generate energy in response to a rotation of each of the rollers; and one or more flexible arms mechanically connected to the rollers and configured to apply a force to each roller.

13. The system of claim 12, wherein the one or more flexible arms alternate between an engaged state wherein rotating the one or more rollers causes the one or more flexible arms to rotate, and a disengaged state wherein rotating the one or more rollers does not cause the one or more flexible arms to rotate.

14. The system of claim 12, wherein the one or more rollers alternate between an engaged state wherein the one or more rollers contact the one or more wheels, and a disengaged state wherein the rollers do not contact the one or more wheels.

15. The system of claim 12, wherein the one or more wheels is a tread.

16. The system of claim 12, wherein the vehicle is a car, truck, or bus.

17. The system of claim 12, wherein the vehicle is a rail vehicle.

18. A system for generating energy in response to a vehicle wheel rotation, wherein the system comprises:

a wheel located within a wheel well of a vehicle, the wheel including a groove, the groove located between a tread of the wheel and spanning an outer circumference of the wheel;

a first roller and a second roller configured to:
contact the groove; and
rotate in response to a rotation of the wheel,
wherein a portion of each roller is configured to fit within the groove;

a generator rotatably coupled to each roller and configured to generate energy in response to a rotation of the roller;

a first flexible arm mechanically connected to the first roller and configured to apply a force to the first roller to cause the first roller to contact the groove of the wheel; and a second flexible arm mechanically connected to the second roller and configured to apply a force to the second roller to cause the second roller to contact the groove of the wheel.

19. The system of claim 18, further comprising a third flexible arm connected to the generator and rotatably coupled to the first and second flexible arm.

20. The system of claim 19, wherein the third flexible arm is rotatably coupled to the first and second flexible arm by one or more sprockets.

* * * * *